US007463766B2

(12) United States Patent
Grove

(10) Patent No.: US 7,463,766 B2
(45) Date of Patent: Dec. 9, 2008

(54) TEXTURING METHOD AND APPARATUS

(75) Inventor: Jonathan Gordon Grove, Bordon (GB)

(73) Assignee: Superscape Group PLC, Hook, Hampshire (GB)

( * ) Notice: Subject to any disclaimer, the term of this patent is extended or adjusted under 35 U.S.C. 154(b) by 693 days.

(21) Appl. No.: 10/469,656

(22) PCT Filed: Mar. 1, 2002

(86) PCT No.: PCT/GB02/00921

§ 371 (c)(1),
(2), (4) Date: Jul. 26, 2004

(87) PCT Pub. No.: WO02/071335

PCT Pub. Date: Sep. 12, 2002

(65) Prior Publication Data

US 2005/0007378 A1     Jan. 13, 2005

(30) Foreign Application Priority Data

Mar. 1, 2001     (GB)     .................................. 0105103.6

(51) Int. Cl.
*G06K 9/00* (2006.01)
*G06K 9/54* (2006.01)
*G06K 9/60* (2006.01)
*G09G 5/00* (2006.01)

(52) U.S. Cl. ........................ 382/162; 382/305; 345/582; 345/583

(58) Field of Classification Search ................. 382/162; 345/582–588
See application file for complete search history.

(56) References Cited

U.S. PATENT DOCUMENTS 5,204,944 A * 4/1993 Wolberg et al. ............. 345/427

(Continued)

FOREIGN PATENT DOCUMENTS

JP          6266852          9/1994

(Continued)

OTHER PUBLICATIONS

Clifton et al., "On the Fly Texture Computation for Real-Time Surface Shading", IEEE Computer Graphics and Applications, vol. 18, Issue 2, Mar.-Apr. 1998, pp. 44-58.*
Worley S: "A Cellular Texture Basis Function" Computer Graphics Proceedings 1996 (SIGGRAPH). New Orleans, Aug. 4-9, 1996, (Continued)

*Primary Examiner*—Jingge Wu
*Assistant Examiner*—Jose M Torres
(74) *Attorney, Agent, or Firm*—Oppenheimer Wolff & Donnelly LLP

(57) ABSTRACT

A method and apparatus is disclosed for conveying and applying texturing instructions within a very low speed, or bandwidth environment, or where storage capacity is limited; the invention and of particular use in image displaying mobile telephones (16), but also applies to image data storage (184, 186, 188, 190, 192) and use on the Internet. Image texturing is defined by a texture string (198) defining a seed number (200) for pseudo random generation of z axis displacement of pixels from an initial surface, a roughness value (202) for the surface, warp function values (204, 206), distortion function values (208, 210), texturing cell style and size data (212, 214) colour information (216, 218, 220, 222, 224, 226) and indication of where the texture is to be used (228). Cells (20) tile and wrap.

23 Claims, 24 Drawing Sheets

U.S. PATENT DOCUMENTS 5,841,441 A * 11/1998 Smith ........................ 345/587
6,215,496 B1 * 4/2001 Szeliski et al. .............. 345/419
6,424,351 B1 * 7/2002 Bishop et al. ............... 345/582

FOREIGN PATENT DOCUMENTS

| JP | 08016794 | 1/1996 |
|----|----------|--------|
| JP | 10302079 | 11/1998 |
| JP | 10320569 | 12/1998 |

OTHER PUBLICATIONS

Computer Graphics Proceedings (SIGGRAPH), New York, NY: ACM, US, Aug. 4, 1996, pp. 291-294, XP000682744 p. 291, left-hand column, line 1—line 10 p. 292, right-hand column, line 41—p. 293, right-hand column, line 8.

Koichi Okada, GNU Mastering OS/2 with C/C++ Compiler, "Warp4" Programming, TRY! PC, Japan, CQ Publication Co. Ltd., May 1, 1998, Summer Issue in 1998, pp. 96-114.

* cited by examiner

TEXTURING METHOD AND APPARATUS

FIELD OF THE INVENTION

The present invention relates to the surface texturing of graphic images for display on a screen. More particularly, the present invention relates to compact methods for applying surface textures to graphic images.

BACKGROUND OF THE INVENTION

A key feature of most three-dimensional computer models, for viewing in two dimensions on a screen, is the selection of suitable texture maps. Texture maps are used to provide details of various surface properties, such as colour, opacity, roughness, shading, transparency, and so on. Often, texture maps are created from photographs or scanned images. This can result in very large file sizes.

New applications of texture maps, such as in images transmitted to be viewed on mobile telephone displays, require a very small bandwidth. There is simply not enough time to send large files. The present invention seeks to provide a method and apparatus apt for use with mobile telephones.

It is a problem of image storage on discs that the images take up very large amounts of space. The texturing information forms a large part of the required storage. The present invention seeks to provide an improved method and apparatus for image storage on discs, allowing storage of more images on the same disc.

In a limited band width or capacity situation, the present invention seeks to provide a means whereby more surface texture can be transmitted in a fixed time, or over a fixed bandwidth, or stored in a fixed space.

Users of the World Wide Web are often, with good reason, impatient. A user will wait only a certain amount of time before abandoning a web page and going elsewhere. By allowing the rapid transmission of texture data, the present invention seeks to provide a means whereby web pages are more rapidly made available.

SUMMARY OF THE INVENTION

In general terms, the present invention applies to any application which relies on the general appearance of an image rather than the specifics of an image itself, and which relies on limited storage or bandwidth. The present invention is particularly useful for display of background images and spot graphical effects on web pages, generation of a wide range of paper texture effects for paint programmes, display of pleasing images on storage limited devices such as palm top computers, and efficient storage and transmission of very large high resolution textures for printing.

According to a first aspect, the present invention consists in a method of generating a surface texture in an image, comprising the steps of: employing a texture of pixels; allocating a random value for each pixel in the field; moving the pixels; dividing the texture into wrappable cells; and allocating a colour to each pixel.

The first aspect further provides that the step of allocating a random value to each pixel includes controlling the roughness of the random values.

The first aspect further provides that the step of moving the pixels includes warping the pixels.

The first aspect further provides that the step of moving the pixels includes distorting the pixels.

The first aspect, further provides that the step dividing the texture into wrappable cells includes the step of selecting the shape of the cells.

The first aspect, further provides that the step dividing the texture into wrappable cells includes the step of selecting the size of the cells.

The first aspect of the invention, further, provides that the step of allocating a colour to each pixel includes taking account of the position of the pixel.

The first aspect of the invention, further, provides that the step of allocating a colour to each pixel includes taking account of the movement of the pixel.

The first aspect of the invention, further, provides that the step of allocating a colour to each pixel includes taking allocating from within a selected range of colours.

The first aspect of the invention further provides for use of a computer program to generate the surface texture.

The first aspect of the invention further provides for use of a texture data string to generate the surface texture.

According to a second aspect, the present invention consists in an apparatus, operating according to the method of the first aspect.

According to a third aspect, the present invention consists in a computer program, operating according to the first aspect, According to a fourth aspect, the present invention consists in a memory device, bearing a copy of the computer program.

According to a fifth aspect, the present invention consists in a texture string message.

According to a sixth aspect, the present invention consists in a computer device, containing a program to cause it to operate according to the first aspect.

According to a seventh aspect, the present invention consists in a computer, operative to generate the texture data string.

BRIEF INTRODUCTION TO THE DRAWINGS

The invention is further explained, by way of an example, by the following description, read in conjunction with the appended drawings in which.

PARTICULAR DESCRIPTION

Figure 1:
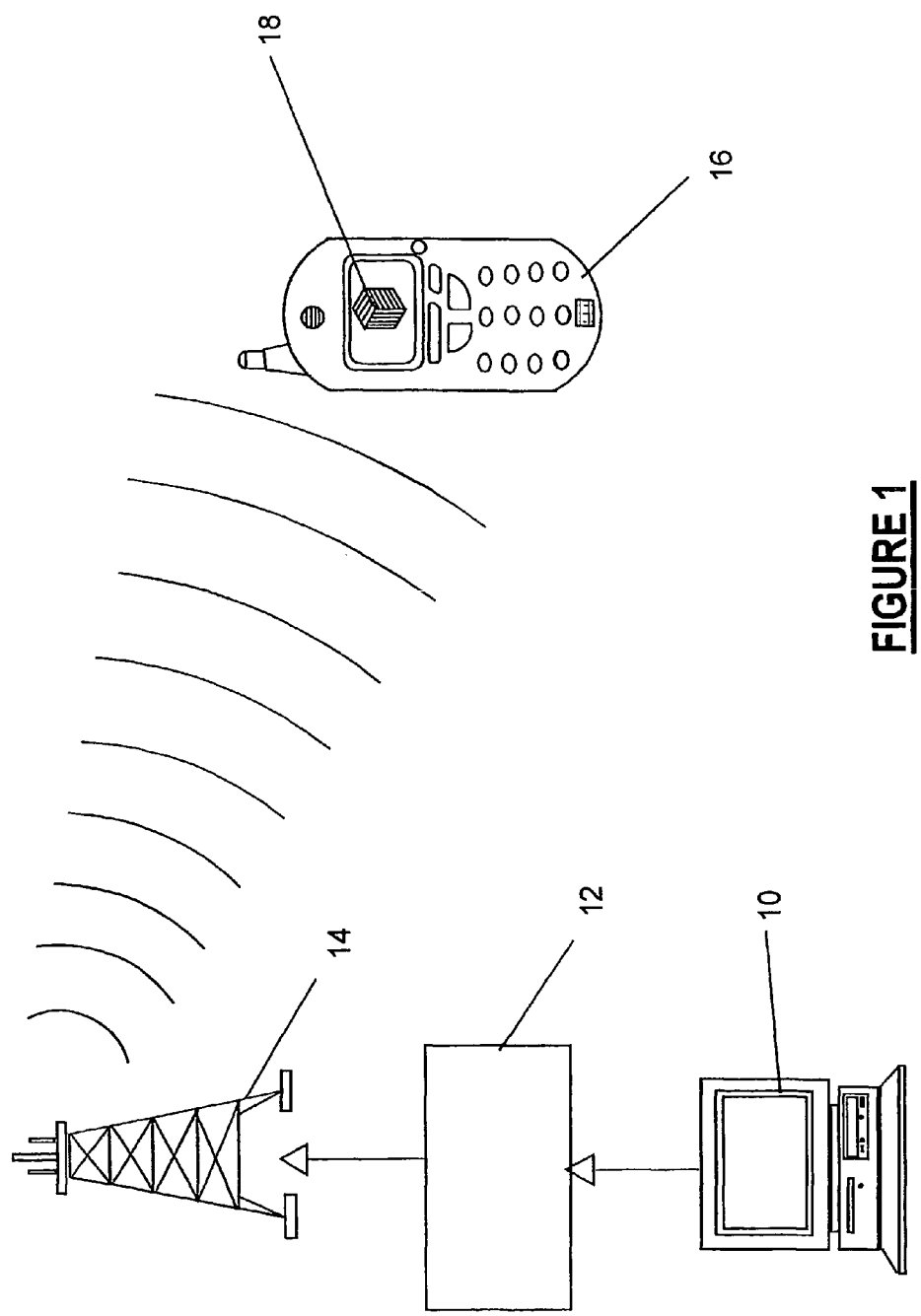
FIG. 1 shows a schematic view of the general situation wherein the preferred embodiment of the invention is employed.

Attention is drawn to FIG. 1 which shows one of the environments wherein the present invention can be applied. An image generation source 10, here shown as a computer, sends image data to the telephone network 12, which, in turn, sends image data to the mobile telephone network 14 and thence to a mobile telephone 16 which displays the image 18 represented by the data from the image generation source 10. It is the object of the present invention to provide the image 18 which can have a wide range of surface textures for a very small amount of image data.

FIGS. 2A to 2E show the starting point of the surface texture generation process. A texture 20 is provided. The texture 20, in this instance, is square. In general, this is a rectangle the same height and width as the final texture.

The texture 20 is divided into cells 22. The cells 22 form a regular pattern in the texture 20 and have the property of "wrapping". That is to say that when the top edge 24 is, figuratively speaking, wrapped around to join the bottom edge 26, the pattern of cells 22 is continuous. Equally, when the right edge 28 is wrapped around to the left edge 30 the pattern of cells 22 is again continuous.

Figure 2A:
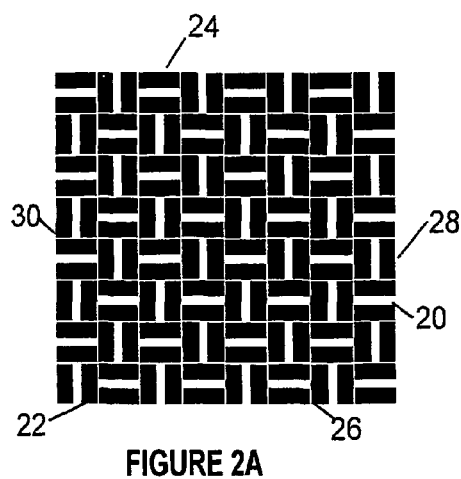
FIG. 2A-FIG. 2E show examples of different textures, having different styles of cell, used in the present invention.
Figure 2B:
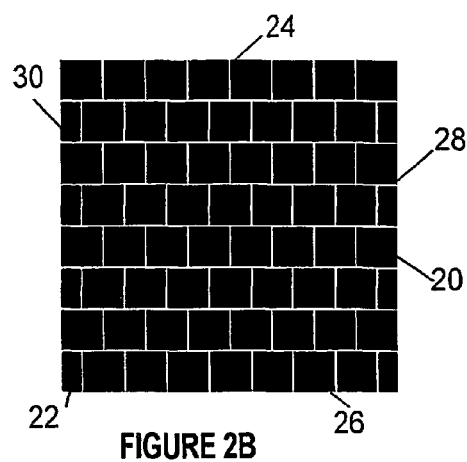
Figure 2C:
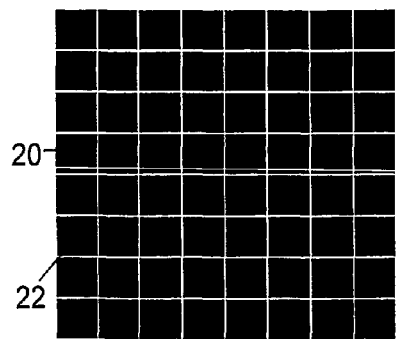
Figure 2D:
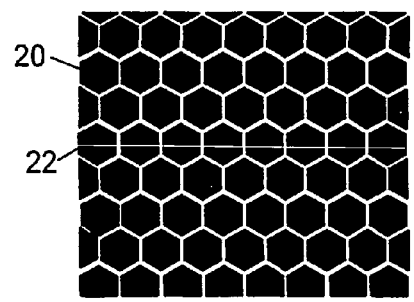
Figure 2E:
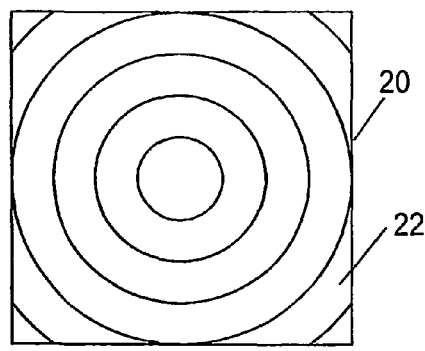

Different kinds of cell 22 are possible. FIG. 2A shows a pattern of cells called "Weave". FIG. 2B shows a pattern called "Brick". FIG. 2C shows a pattern called "Rectangular". FIG. 2D shows a "Hexagonal" cell 22 in the texture 20. FIG. 2E shows a cell 22 pattern "Rings".

Figure 3A:
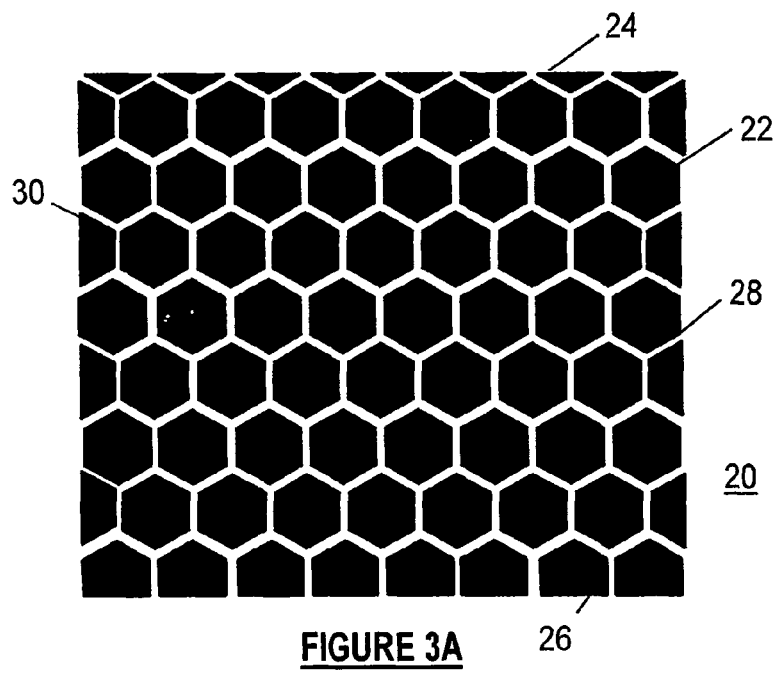
FIG. 3A and FIG. 3B show the wrapping feature of the textures of FIG. 2, in this instance showing tessellating cells.
Figure 3B:
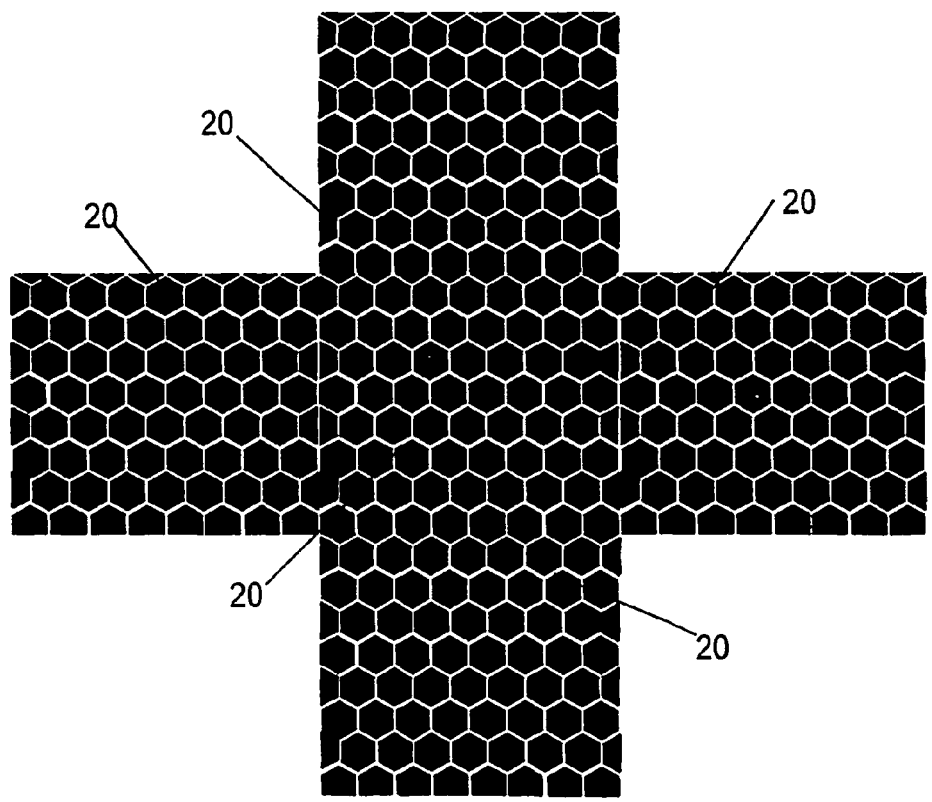

Attention is drawn to FIG. 3A showing the wrapping feature in more detail. FIG. 3A shows the Hexagonal cell 22 texture 20 and, immediately below, a tessellation of five textures 20 in FIG. 3B showing how the Hexagonal cells 22 form a continuous pattern at every edge 24, 26, 28, 30 of the texture. In this case, the Hexagonal cells 22 form a complete tessellation. pattern at every edge 24, 26, 28, 30 of the texture. In this case, the Hexagonal cells 22 form a complete tessellation.

Figure 4A:
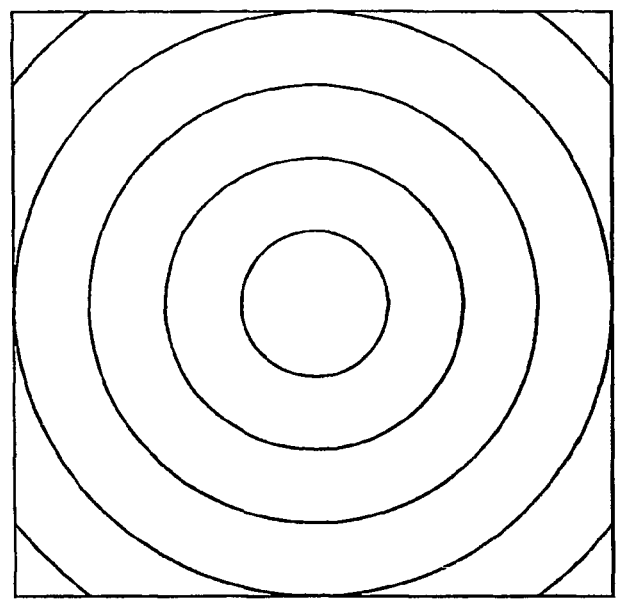
FIG. 4A and FIG. 4B illustrate the wrapping of textures of FIG. 2 using matching cells.
Figure 4B:
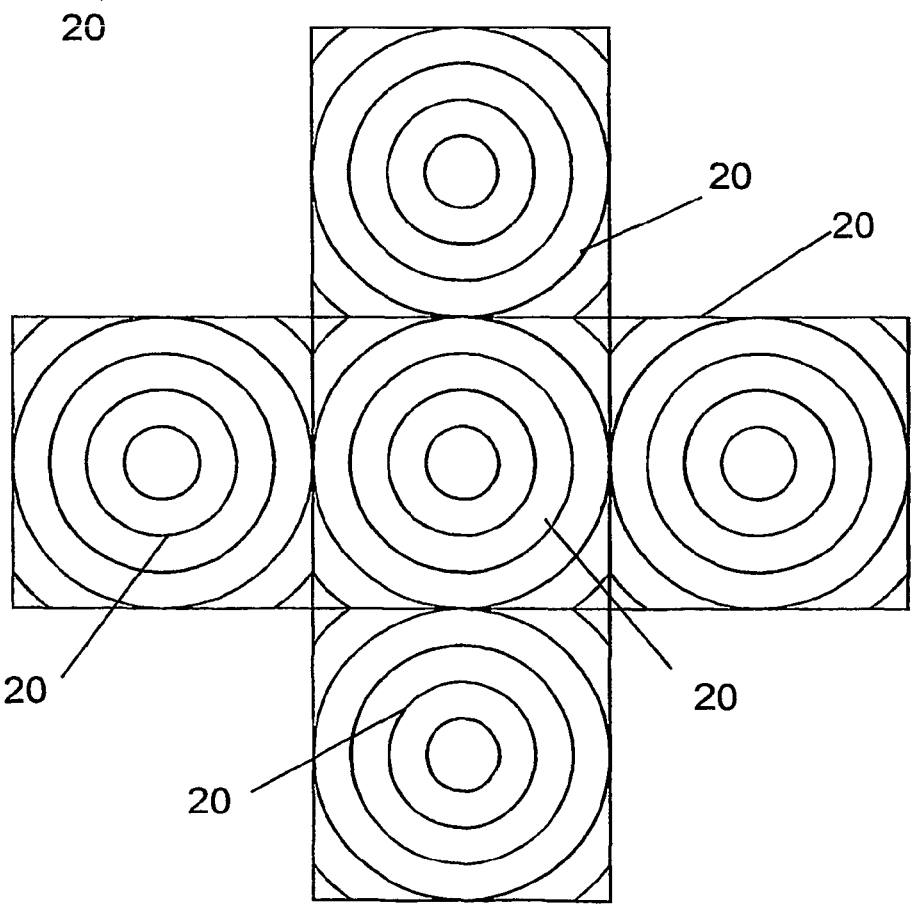

FIGS. 4A and 4B show the same process as FIGS. 3A and 3B, this time using the "Rings" cells 22 otherwise shown in FIG. 2E. In this case the Rings simply match at the edges 24, 26, 28, 30 and do not form, in the classic sense, a tessellation. FIGS. 4A and 4B show that the essence, of the "wrapping" process wrapability depends on there being a match across the edges 24, 26, 28, 30.

The surface, to be textured, is covered with a texture 20. One of the various types of texture 20 is selected. The cell 22 types, being simple, can either be generated by a mathematical algorithm or simply stored and retrieved with little use of memory. One of the cell 22 types is selected.

Figure 5:
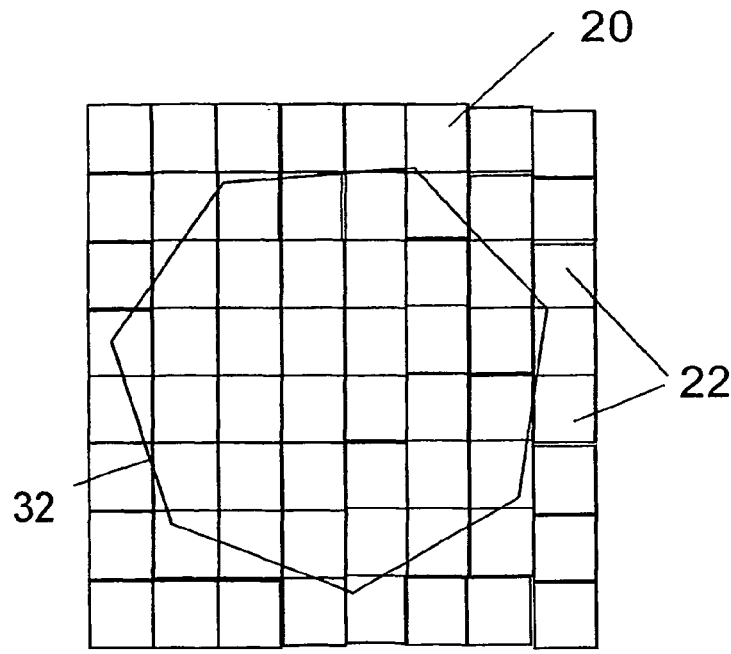
FIG. 5 shows an object, to be covered with a surface texture, in relation to the cells of a texture.

FIG. 5 illustrates one possible way how cells 22 can cover an object. An object 32, generally represented in this example as a heptagon, is covered in an array of cells 22 of a single texture 20 to at least its edge. The cells 22 will be visible, in the completed image, only to the edge of the object 32, (cropped at the edge of the object 32). There must, however, be a degree of overlapping so that this condition can be fulfilled. In practice, it is assumed that the texture repeats infinitely many times across the whole plane. Alternatively, the texture 20 can be "wrapped" around the object or "projected onto" the object, in a manner known in the art.

The object 32 is either a two dimensional surface, or a two dimensional projection of a three dimensional surface, being part of an image generated by, for example, but not restricted to, United Kingdom Patent Application Number 9926131.5 "Image Enhancement" filed 5 Nov. 1999 by the same applicants.

Any other object 32 generated by any other means can be the subject of the present invention. All that is required is that the object 32 has a surface capable of accepting a texture.

Figure 6:
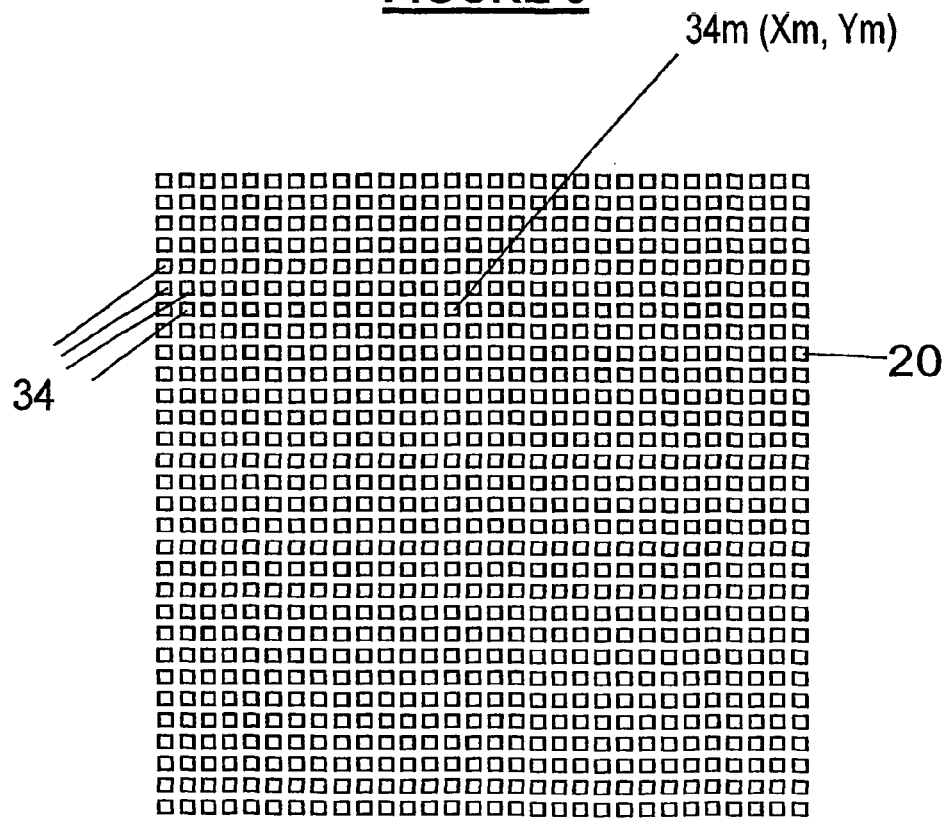
FIG. 6 shows individual pixels within a texture.

FIG. 6 shows a texture 20. The texture 20 comprises a plurality of spaced pixels 34 (here shown more widely spaced and fewer in number than in reality) each having its own coordinates within the texture 20. As an example, shown in FIG. 6 is the individual mth pixel, 34$m$, has its X and Y coordinates $X(m), Y(m)$. The texturing process, the subject of the present invention, is effectively a mapping from the pixel coordinates $X(m) Y(m)$ to a new positional and colour value.

Figure 7:
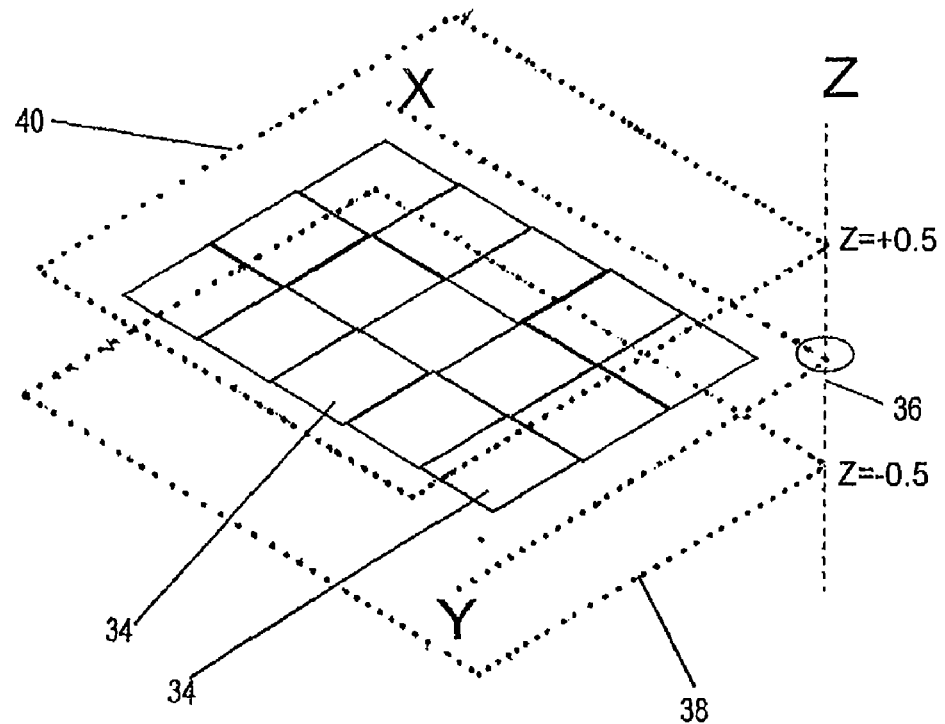
FIG. 7 shows individual pixels prior to a randomising process.

In FIG. 7 is a projected view of a section of the individual pixels 34, as otherwise shown in FIG. 6. A set of axes 36 is shown imposed, where the X Y plane is the plane of the pixel 34, and is located on the plane surface at Z=0. Also shown is a lower bounding plane 38, located at the value Z=−0.5 and an upper bounding plane 40, located at the value Z=+0.5. The first action in the texturing operation is to assign a number to each of the pixels 34. The assigned number is illustrated, in a figurative way in FIG. 8, as a Z value on the axes 36. Each pixel 34 is shown displaced along the Z axis by its assigned value.

Figure 8A:
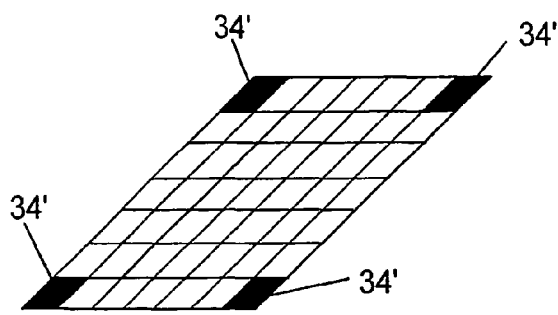
FIGS. 8A to 8D are project views illustrating the randomising process and FIG. 8E is a flow chart of the randomising process.
Figure 8B:
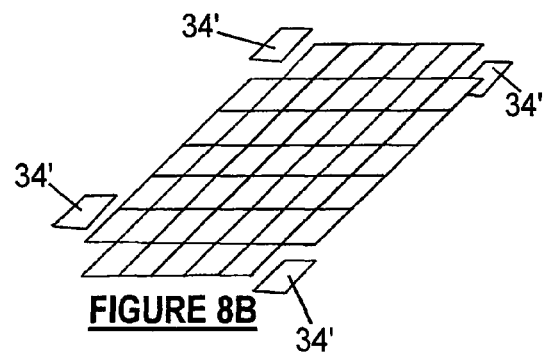
Figure 8C:
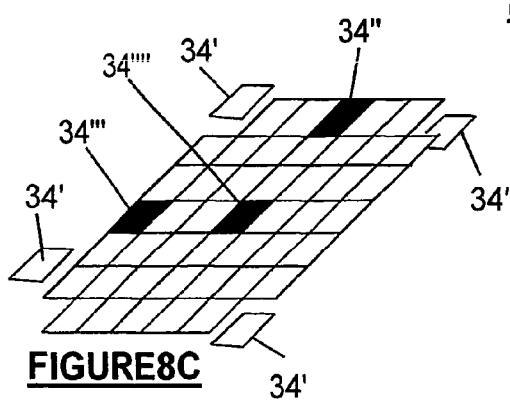
Figure 8D:
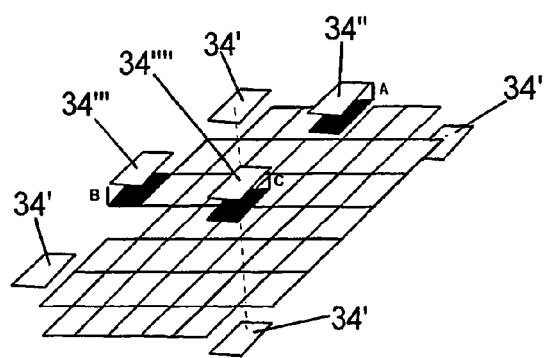
Figure 8E:
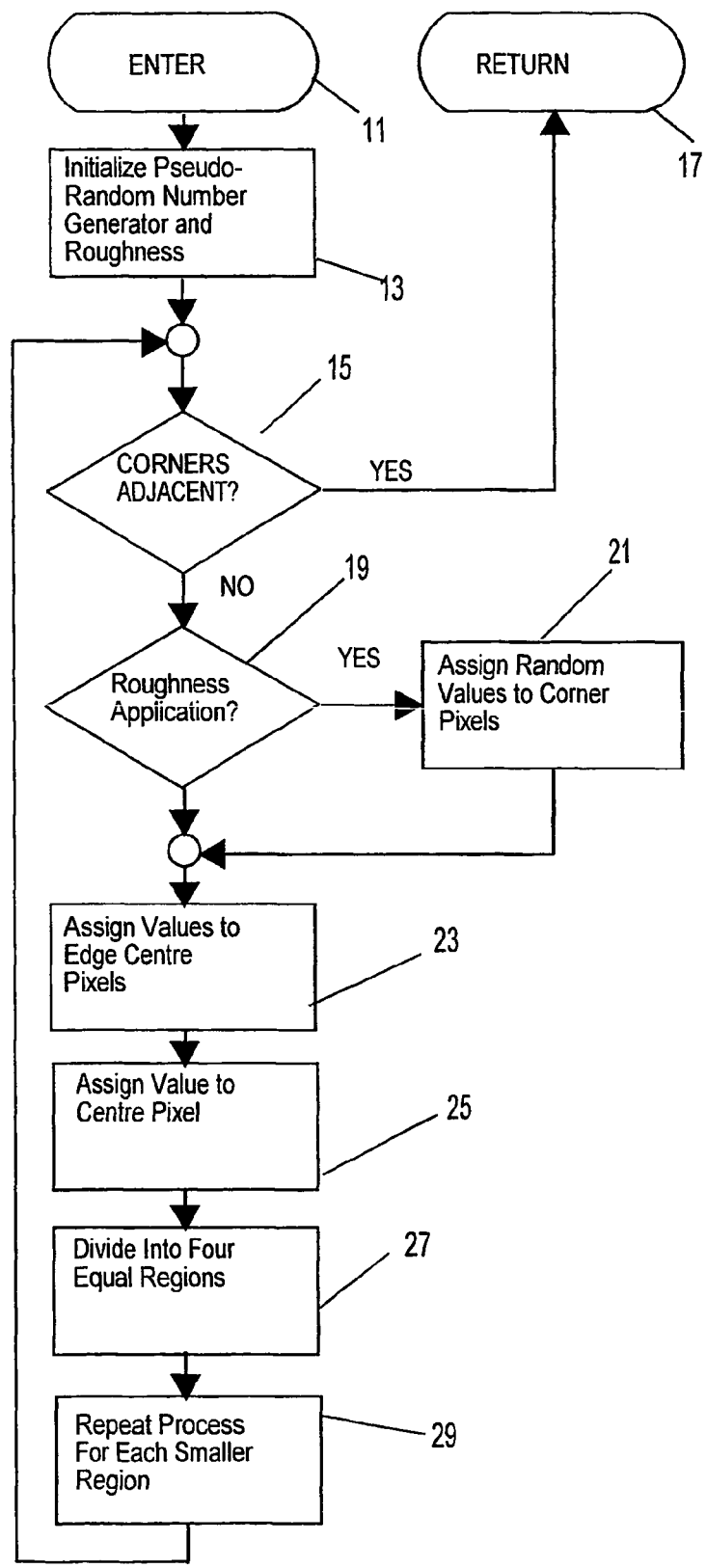

FIGS. 8A to 8D show successive stages in the assignment of Z values to a pixel 34, and FIG. 8E shows a flowchart of the assignment process.

Attention is drawn to FIGS. 8A to 8D. A value is assigned to each pixel 34 using a pseudo random methos which generates a set of values known as a plasma field. A seed number is selected, and a roughness value. The seed number is applied to a pseudo-random number generation process, which supplies pseudo-random values when required. Initially, a pseudo-random value between −0.5 and +0.5 is assigned to each corner pixel 34' in the plasma field, and an initial step value of ½ is assigned.

Three pseudo-random values, P, Q and R, between −0.5 and +0.5 are selected such that their sum is 0.

The midpoint pixel 34" along the top edge is selected and assigned a value which is the average of the two values of the adjacent corner pixels 34', added to the previously selected pseudo-random value P multiplied by the current step value.

The midpoint pixel 34''' along the left edge is selected and assigned a value which is the average of the two values of the adjacent corner pixels, added to the previously selected pseudo-random value Q multiplied by the current step value.

The centre pixel 34'''' is assigned a value which is the average of the four corner pixels, added to the previously selected pseudo-random value R multiplied by the current step value.

The field is then broken into four smaller squares, each half the size the step value is halved, and the process is then repeated with each smaller square starting with the selection of new pseudo-random values P',Q' and R', until all pixels 34 in the field have been assigned a value.

The assigned roughness is used to modify the initial step, where the corner pixels 34' are given their initial pseudo-random values. If the roughness is non-zero, then this step is applied to the smaller squares at a number of subsequent stages also, that number being determined by the roughness value. Thus, the user is able to select a second feature for the texture.

Attention is drawn to FIG. 8E which shows a flow chart of the Z value assignment process. From and entry 11 a set up operation 13 places the seed number in the pseudo-random number generator, initialises the pseudo-random number generator and sets the roughness value. Thereafter, a corner test 15 checks to see if the corner pixels 34' have come into contact with each other. This signals the end of the process. If they have, the assignment operation exits to a return 17, if it has not, a roughness test 19 checks to see if roughness is to be applied. If it is, a roughness operation 21 assigns random values to the corner pixels 34'. Both the roughness test 19 and the roughness operation 21 pass control to an edge centre operation 23 which assigns values to the edge centre pixels 34", 34''' thereafter a centre pixel operation 25 assigns a value to the centre pixel 34''''. A division operation 27 then divides the field into four equal regions. A repeat operation 29 repeats the process for each smaller region until the corner test 15 detects that the entire field has been covered, each pixel 34 having been assigned a Z value.

Figure 9A:
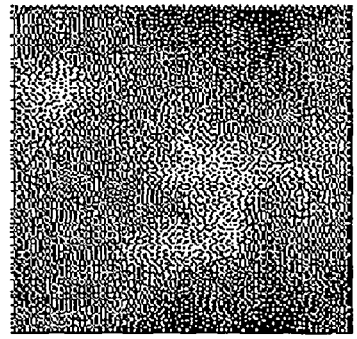
FIG. 9A to FIG. 9F show various degrees of roughness which can be achieved using the present invention.
Figure 9D:
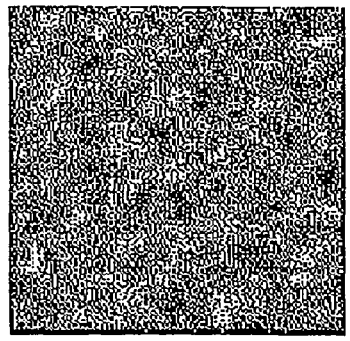
Figure 9B:
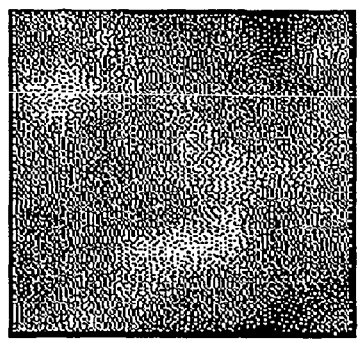
Figure 9E:
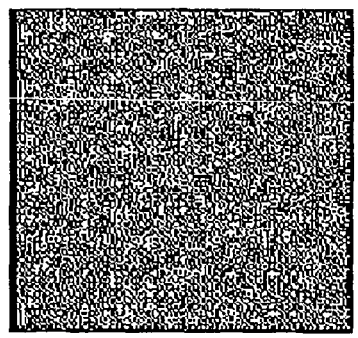
Figure 9C:
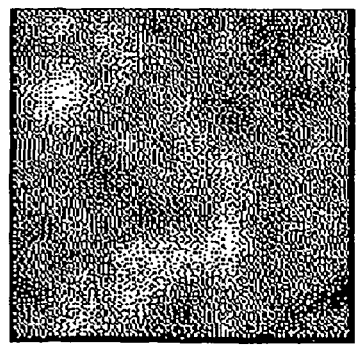
Figure 9F:
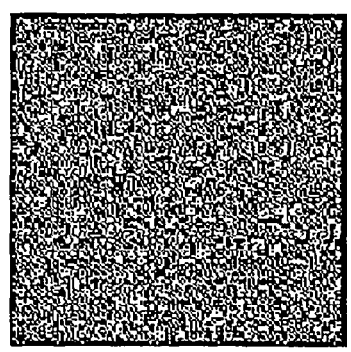

FIG. 9A to FIG. 9F illustrate the effects of roughness on a final image. In FIG. 9A, the roughness value is set to zero and the image is substantially smooth. In FIG. 9B the roughness value is set to 1 and the image becomes a little finer in detail. FIGS. 9C, 9D, 9E and 9F have respective roughness values of 2, 3, 4, and 5. The effect on the final image is clear from the figures. FIG. 9A shows a surface which might, for example, appear on a piece of satin fabric, whereas FIG. 9F resembles sandpaper. Just by varying the roughness value on the same set of pixels 34 on a texture 20, with the same pseudo random number generator seed number, all these different effects can be achieved.

The next action in the texture forming operation is "warping". Warping is the large-scale deformation of the texture. It can be used to create controlled curves, zig-zags and ripples in the final image. For each axis X, Y in the texture, a warping function is defined by the user. For every X coordinate the Y warping returns an off-set to be applied to the Y coordinate. Similarly for every Y coordinate, the X warping function returns an off-set to be applied to the X coordinate.

The warping functions are defined by a list of pairs of values a, b representing points on a curve.

Figure 10A:
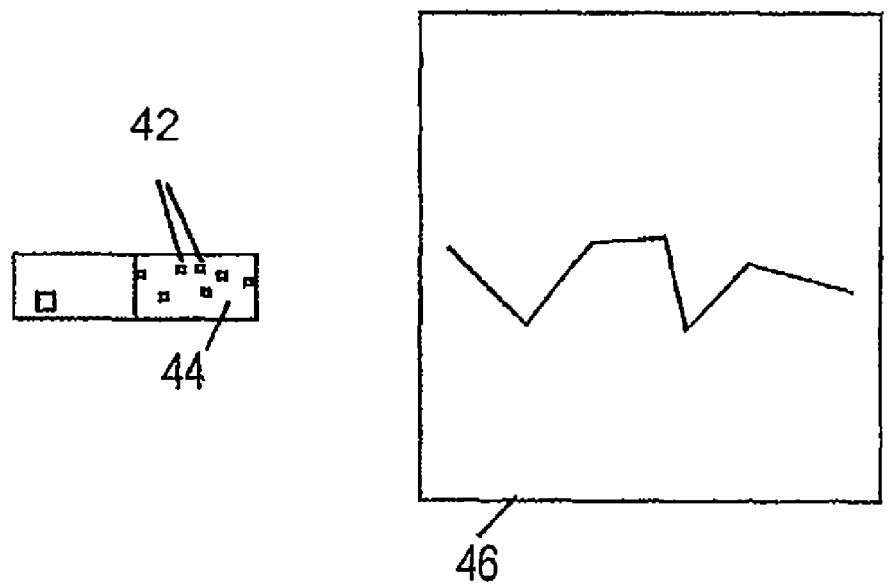
FIG. 10A shows a linear interpolation method employed in a warping process.

FIG. 10A shows a linear interpolation used in warping. The points 42, selected by the texture designer, of the warping curve, are shown, as separate locations on a control icon 44. In this example, a smooth option has not been selected. Consequently, the interpolation between the points 42 is linear. A display 46 shows the resulting warping function comprising straight line segments.

Figure 10B:
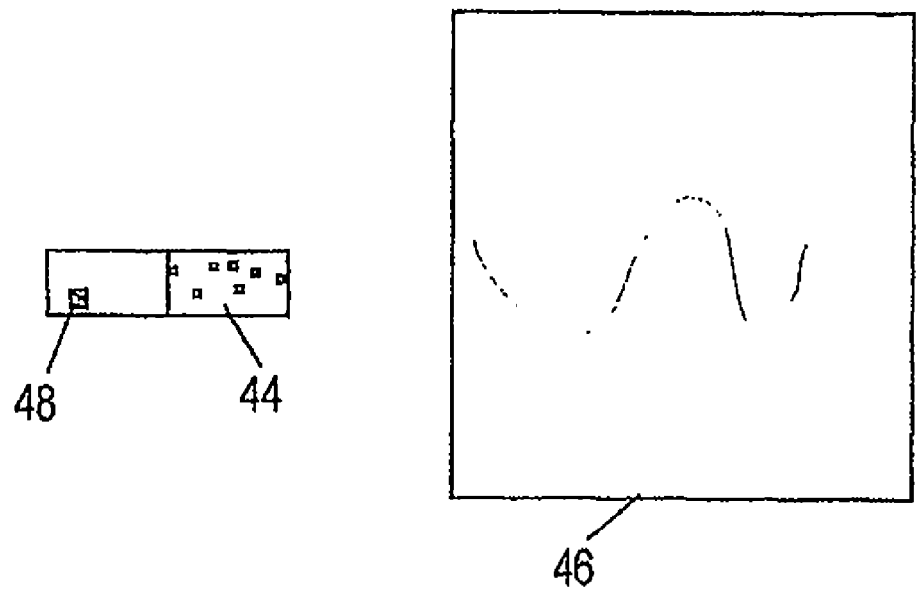
FIG. 10B shows a smooth interpolation method used in a warping process.

FIG. 10B shows the same set of points 42 as is shown in FIG. 10A, but where the smooth option 48 has been selected. The curve, on the display 46, now smoothly interpolates between the points 42, with no sharp angles or straight lines.

For preference, the smoothing function used in FIG. 10B is a Hermite spline curve. This is just one of many smoothing functions which can be used in the invention. For example a Bezier function, or a Bezier spline, can equally be used. Those, skilled in the art, will be aware of numerous other functions which can fulfill this purpose.

Figure 11A:
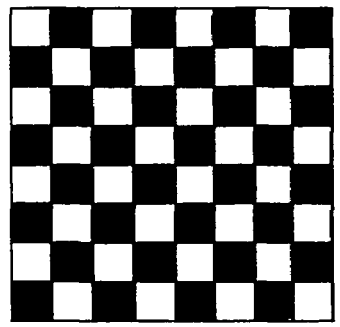
FIGS. 11A to 11E show various examples of the effects that can be achieved with warping.

FIGS. 11A to 11E show examples of the effects of various warping functions. FIG. 11A shows the initial unwarped cell, laid out as a chequerboard for clarity of illustration of effect.

Figure 11B:
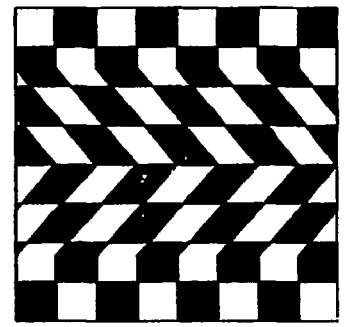
Figure 11C:
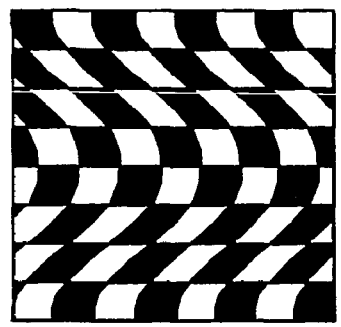
Figure 11D:
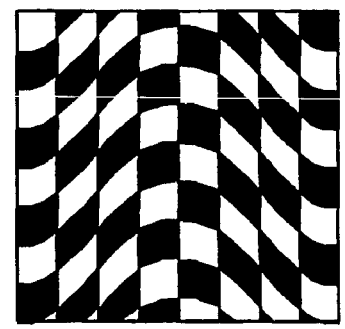
Figure 11E:
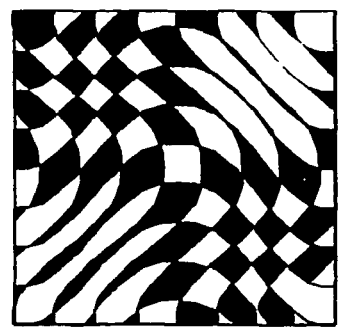

FIG. 11B shows linear warping in the X axis. FIG. 11C shows smooth warping in the X axis. FIG. 11D shows smooth warping in the Y axis. FIG. 11E shows simultaneous smooth warping in the X axis and the Y axis.

The texture designer, is thus able to add a further effect to the texture. To warp the texture, the designer selects points 42 and a linear or smooth option to achieve the desired effect.

The next stage in texture design, if required, enables the texture designer to apply distortion. A variable amount of pseudo-random distortion can be applied to a texture. This can be used to change a regular cell pattern, such as a simple square grid, into something that looks more "organic", perhaps similar to the scales on a crocodile skin.

Figure 12:
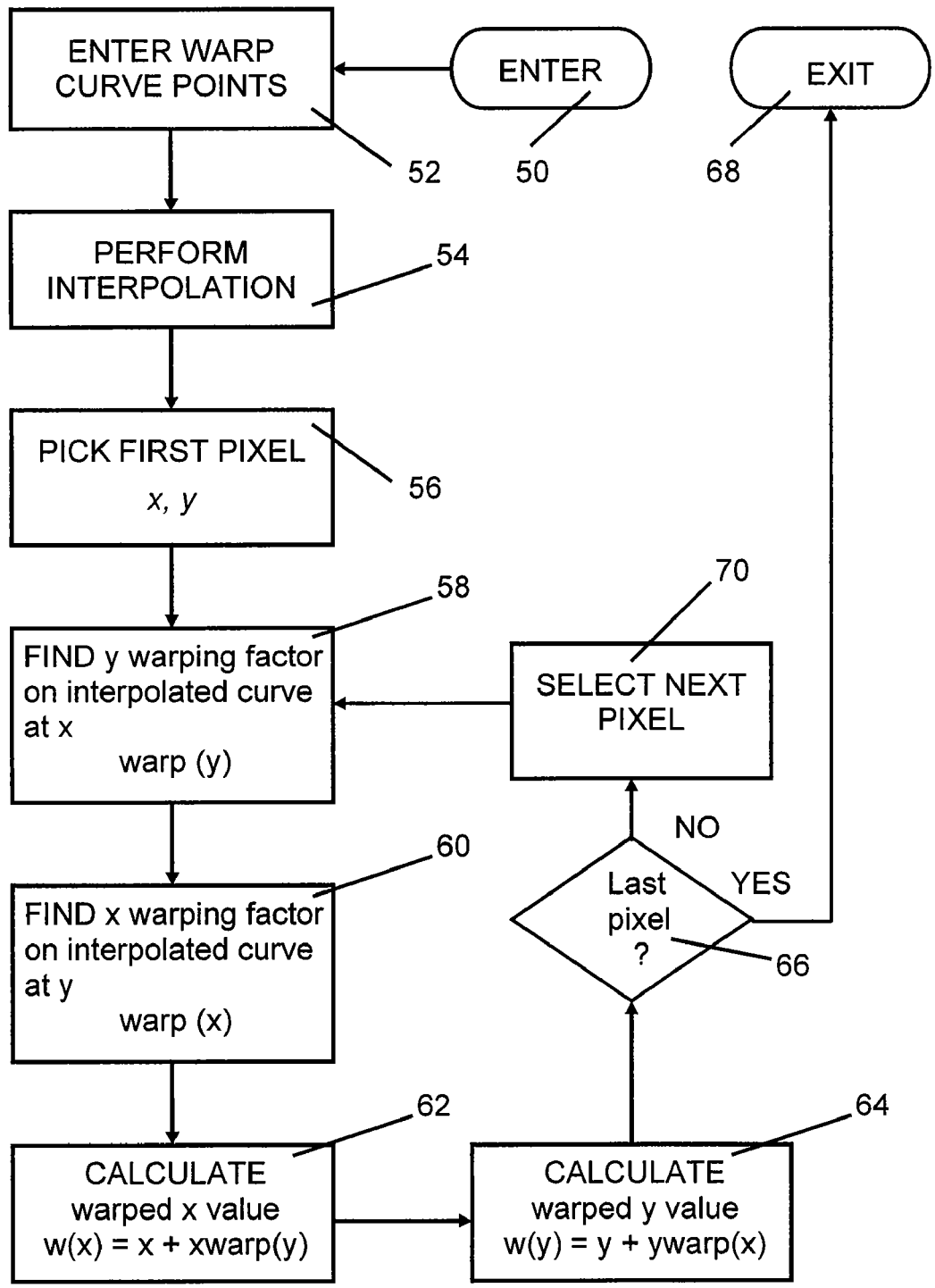
FIG. 12 is a flow chart illustrating the manner in which warping is achieved.

FIG. 12 is a flow chart showing the manner in which a texture 20 is warped. Entry 50 is to a first operation 52 where the warp curve points 42 (from FIG. 9 and FIG. 10) are entered by the texture designer and the preferred manner of interpolation is selected. Thereafter, a second operation 54 performs the interpolation to produce the curves (as seen on the displays 46 of FIGS. 9 and 10).

A third operation 56 then selects the first pixel 34 in the texture 20. Next, a fourth operation 58 finds the y warping factor. To do this, it goes to the curve generated in the second operation 54 at the X value of the pixel 34 which is being processed. The "warp(y)" value, used in a later operation, is the value of the curve at the X value of the pixel 34.

A fifth operation 60 then finds the x warping factor. To do this, reference is made to the interpolated curve generated in the second operation 54. The Y value of the pixel 34 being processed is selected, and the value of the X coordinate, on the curve, is taken. This is the x warping factor "warp(x)".

A sixth operation 62 then calculates the warped x position of the pixel 34 w(x) by adding the X coordinate of the pixel 34 to the product of the X coordinate of the pixel 34 and the y warping factor warp(y). A seventh operation 64 then calculates the warped y position of the pixel 34 w(y) by adding the Y coordinate of the pixel 34 being processed to the product of the Y coordinate of the pixel 34 and the x warping factor warp(x). Thereafter, a first test 66 checks to see if the last pixel 34 in the texture 20 has been processed. If it has, the routine goes to an exit 68. If it has not, control goes to an eighth operation 70 which selects the next pixel 34 in the texture 20 and passes control to the fourth operation 58. In this way, each pixel 34 in the cell 22 is processed in turn until all of the pixels 34 have been processed.

Figure 13:
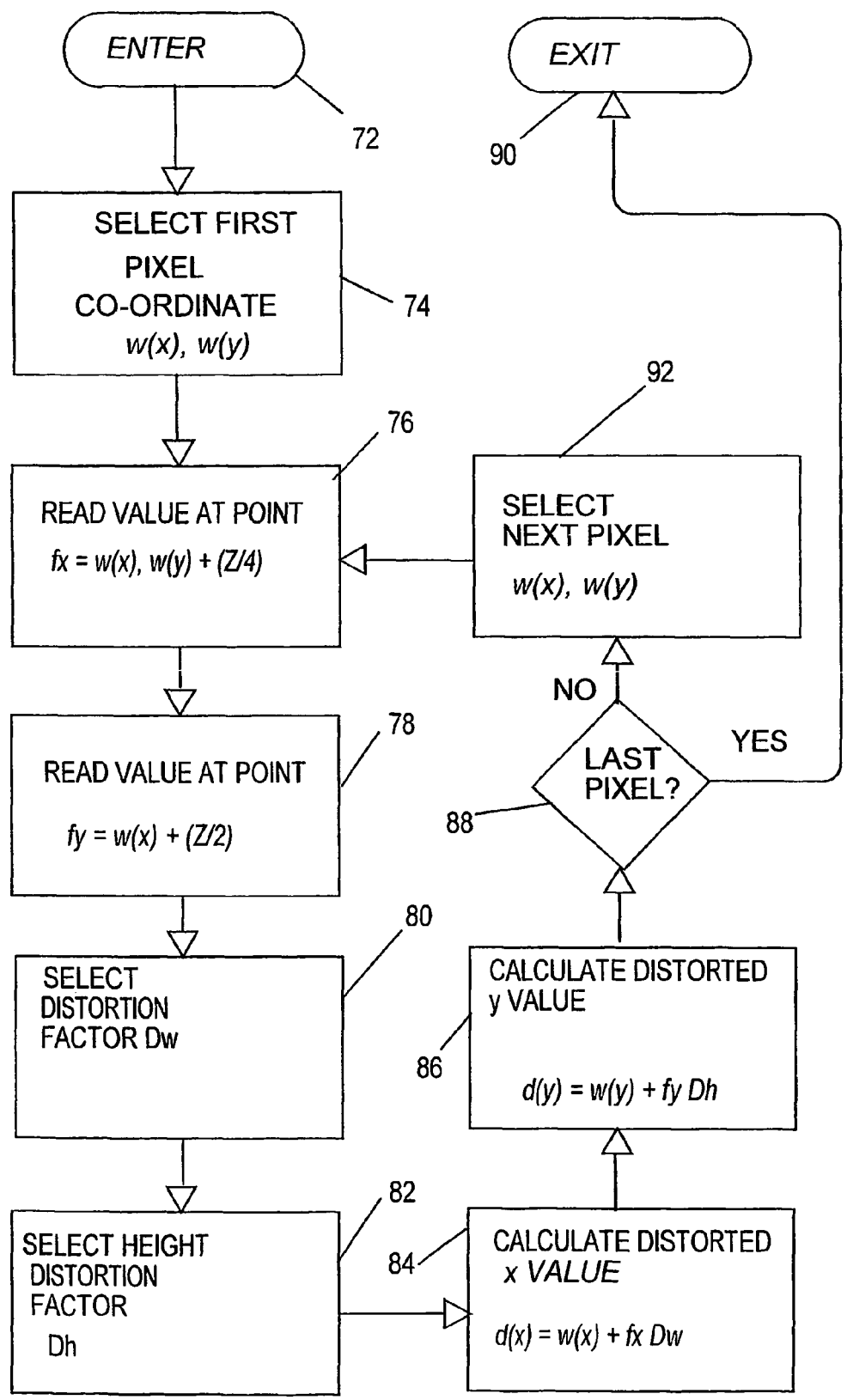
FIG. 13 is a flow chart showing how distortion is achieved.

FIG. 13 is a flow chart of the process whereby distortion is added to a texture 20. From an entry 72, a ninth operation 74 selects the first pixel 34 in the texture 20. The coordinates of a pixel 34 that the distortion process selects are not the initial coordinates of a pixel 34, X, Y which form the starting point of the process of FIG. 12, but, rather, the warped X and Y coordinates from the warping process of FIG. 12, namely W(x), W(y). If there had been no warping, the coordinates of the pixel 34 would have remained as X, Y.

These would then be the values of W(x), W(y) had no warping taken place.

Thereafter a tenth operation 76 goes to the initial plasma field and reads the Z value (see FIG. 8) at a pixel 34, displaced from the warped coordinate W(x), W(y), in the Y direction by one quarter of the Z value (see FIG. 8) assigned to the pixel 34 being processed. This produces an X distortion factor f(x).

An eleventh operation 78 then reads the Z value of a pixel 34, displaced from the pixel 34 being processed, in the Y direction by one half of the Z value assigned to the pixel being processed (see FIG. 8).

A twelfth operation 80 then selects a width distortion factor D(w). A thirteenth operation 82 similarly, selects a height distortion factor D(h). Both the distortion factors D(w), D(h), are provided by the texture designer as another input variable to the final texture.

Thereafter a fourteenth operation 84 calculates the distorted X value d(x) by summing the warped X coordinate W(x) with the product of the X distortion factor f(x) found in the tenth operation 76, and the width distortion factor D(w), selected in the twelfth operation 80. A fifteenth operation 86 then calculates the distorted Y value d(y) by summing the warped Y coordinate W(y) of the pixel 34 being processed with the product of the Y displacement factor f(y), found in the eleventh operation 78, and the height distortion factor D(h), selected in the thirteenth operation 82. A second test 88 then checks to see if the last pixel 34 in the texture 20 has been processed. If all the pixels 34 in the texture 20 have been processed the distortion process passes to exit 90. If the last pixel 34 has not been processed, a sixteenth operation 92 selects the next pixel 34 to be processed and passes control to the tenth operation 76. In this way, all of the pixels 34 in the texture 20 are processed, one by one, until the whole texture 20 is complete.

Figure 14A:
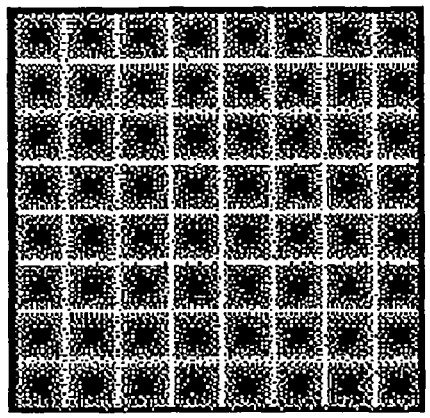
FIG. 14A to FIG. 14F illustrate the effect of various degrees of distortion.
Figure 14B:
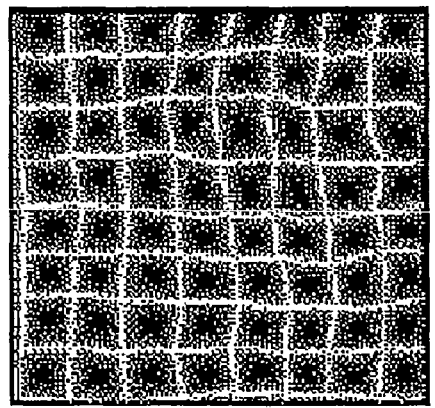
Figure 14C:
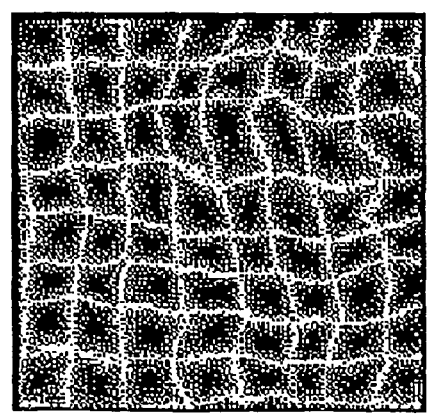
Figure 14D:
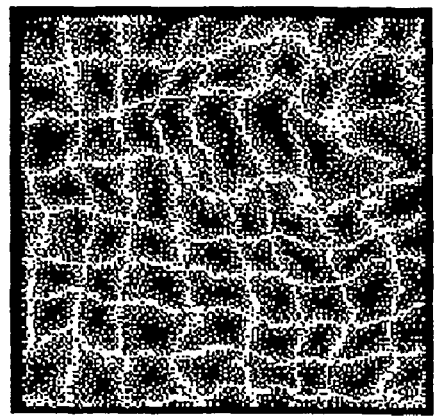
Figure 14E:
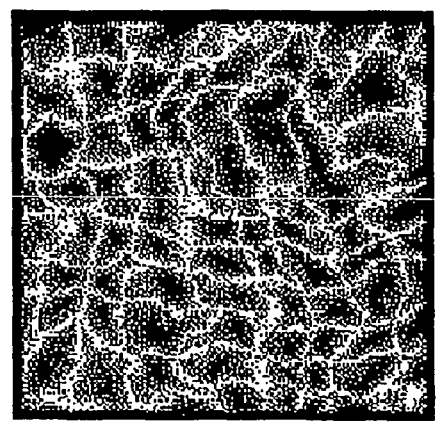
Figure 14F:
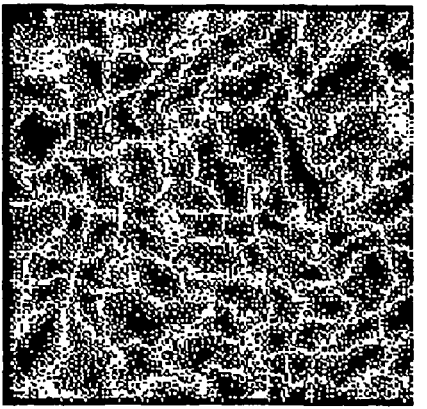

FIGS. 14A to 14F show examples of different degrees of distortion, on a simple square cell 22 pattern for clarity of visible effect. FIG. 14A shows the texture 20 with no warping or distortion. FIG. 14B shows the grid of FIG. 14A with slight distortion. FIG. 14C shows the grid of FIG. 14A with a little bit more distortion than FIG. 14B. FIG. 14D shows the grid of FIG. 14A with a fair degree of distortion. FIG. 14E shows the grid of FIG. 14A with a great deal of distortion. FIG. 14F shows the grid of FIG. 14A with the maximum distortion. The regular grid pattern of time distortion has reached the levels of FIG. 14F achieved an appearance which is apparently, to the eye, chaotic rather than regular. Such a pattern as shown in FIG. 14F emulates the surface of materials like marble.

Figure 15:
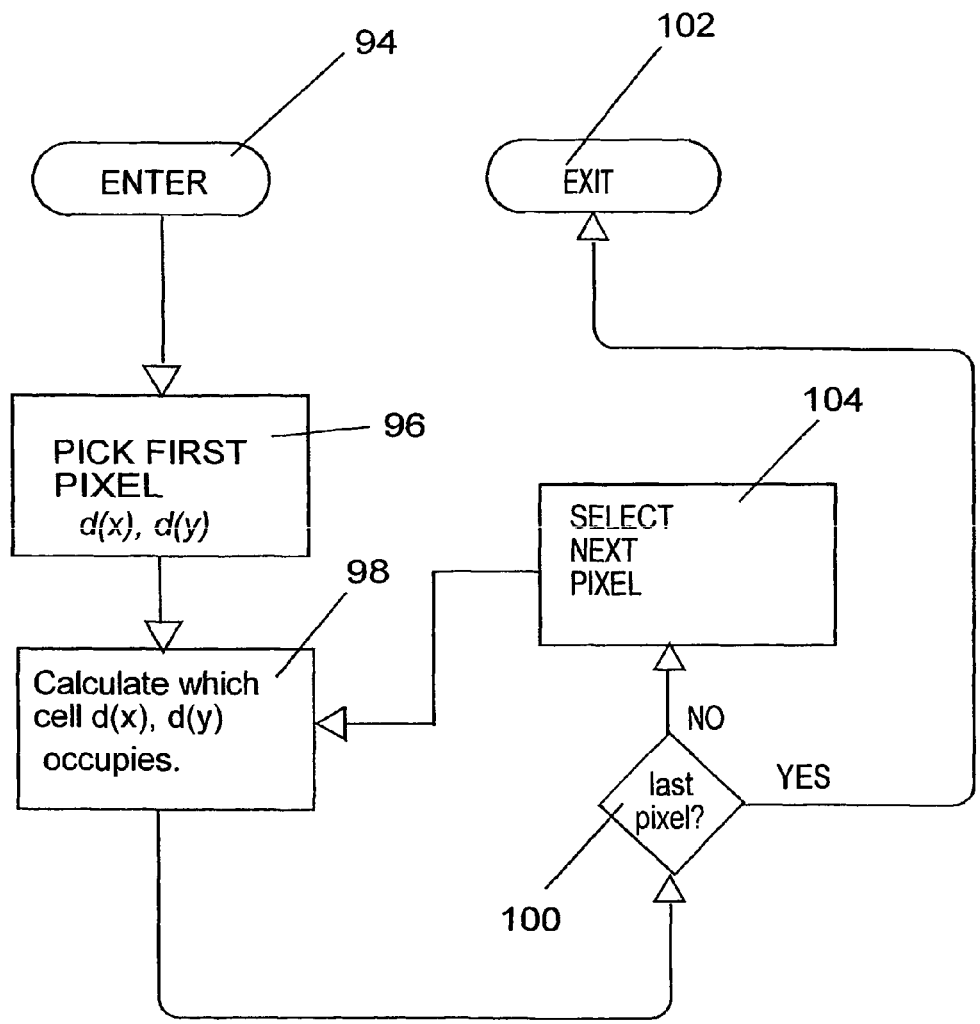
FIG. 15 shows how pixels are allocated to a cell.
Figure 18:
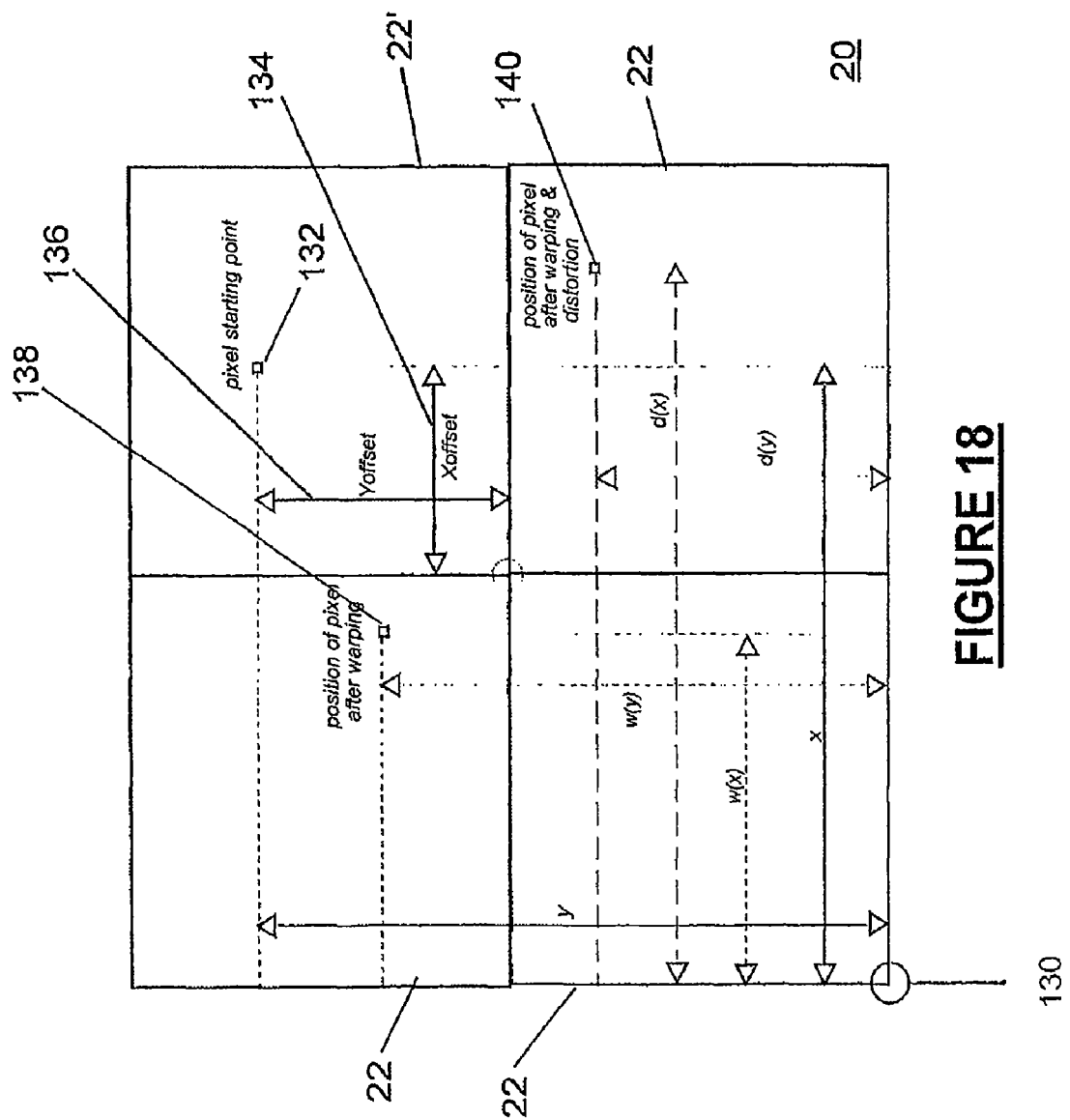
FIG. 18 is a diagram illustrating the meaning of some of the pixel properties used in relation to FIG. 17.

FIG. 15 is a flow chart of the next activity in the preparation of a texture. Having the performed the distortion activity described in FIG. 13, it now becomes necessary to find out, so that further processing can take place, where all of the pixels 34 have moved to. From entry 94, a seventeenth operation 96 selects the first pixel 34 according to the distorted outputs D(x), D(y) from the operation shown in FIG. 13. An eighteenth operation 98 then calculates which cell 22 the pixel 34 under scrutiny actually occupies now that it has been moved around. The cell 22 shape and size is chosen by the texture designer. The analysis is made on the distorted coordinates d(x), d(y) where the pixels 34 have been moved by any warping and distortion which may have been applied. If no warping or distortion has been applied, of course, the pixel 34 remains in its original position X, Y. The designer of the texturing can choose various types of cell, shown in FIG. 2. The cell 22 width and height are specified by the designer, and are usually constrained to provide tileability) such that a whole number of cells 22 will fit across and down the image. Using the boundaries of the selected cell 22 type and size, the pixel 34 is allocated to a specific cell 22. The position of the pixel 34 within the cell 22 is also used to determine the Xoffset 134 and Yoffset 136 values as shown in FIG. 18.

A third test 100 checks to see if the last pixel 34 has been processed. If it has, the activity proceeds to exit 102. If it has not, a nineteenth operation 104 selects the next pixel 34 and returns control to the eighteenth operation 98. In this way, all the pixels 34 are processed and allocated to a cell 22.

Figure 16:
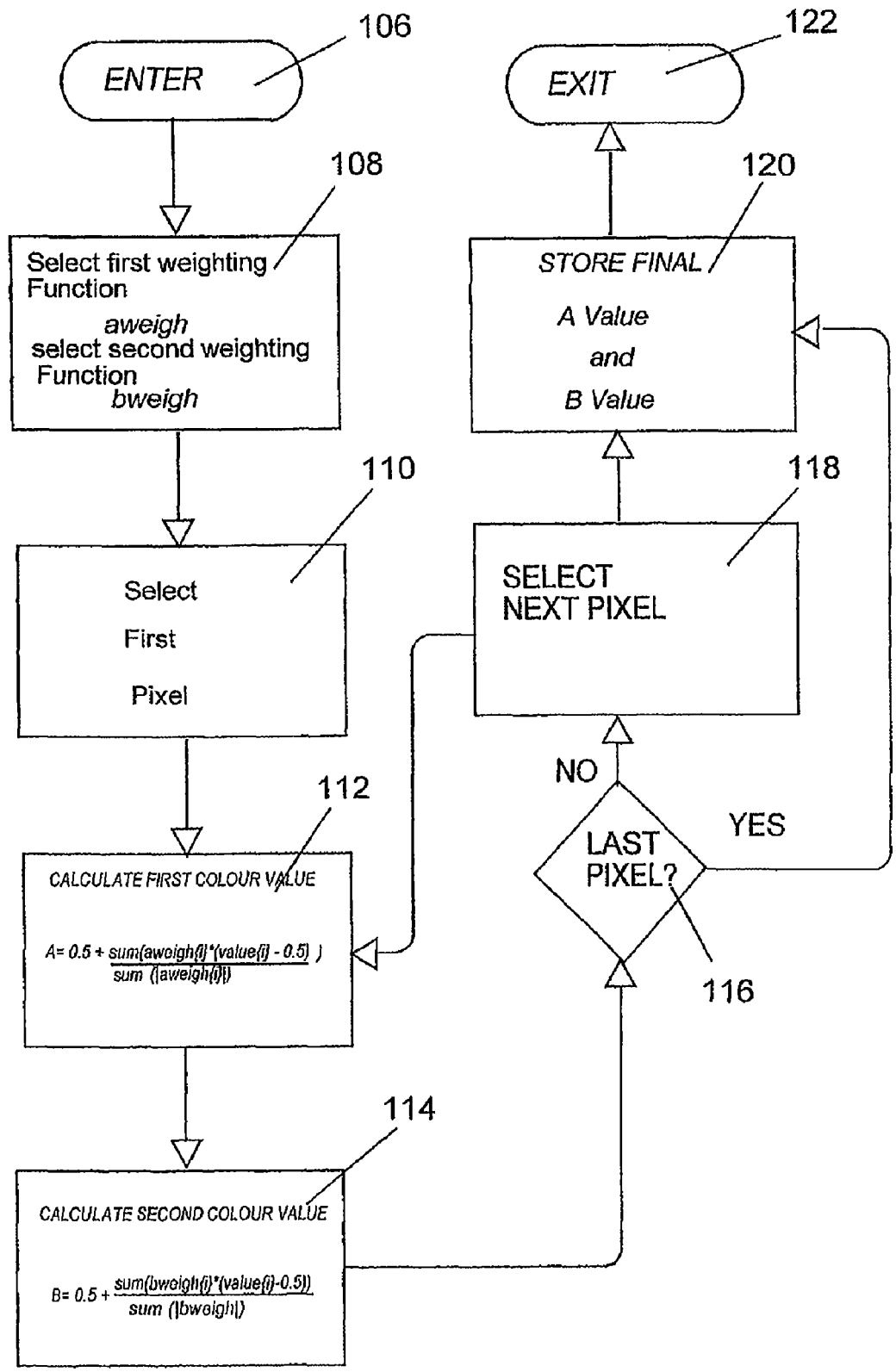
FIG. 16 shows how weighting functions are applied to pixel properties for use in colour selection.

Attention is drawn to FIG. 16 showing the first stage of colouring the texture 20. From an entry 106 a twentieth operation 108 selects a first weighting function "aweigh" and a second weighting function "bweigh". These are sets of coefficients for multiplication with properties of a "pixel vector". These will be used, as described hereafter in relation to FIG. 17, to assist in the calculation of a colour value for each pixel 34.

A twenty-first operation 110 then selects the first pixel 34 in the texture. A twenty-second operation 112 then calculates a first colour value A according to the equation:

$$A=0.5+\text{sum}(a\text{weigh}\{i\}*\text{value}\{i\})/\text{sum}(\text{abs}(a\text{weigh}\{i\}))$$

"Abs" is the absolute value of aweigh{i}. Value{i} is explained in FIG. 17. The sum is taken over the pixel vector for the pixel being processed. Thereafter a twenty-third operation 114 calculates a second colour value B according to the equation shown in the box of the twenty-third operation 114.

$$B=0.5+\text{sum}(b\text{weigh}\{i\}*\text{value}\{i\})/\text{sum}(\text{abs}(b\text{weigh}\{i\}))$$

A fourth test 116 checks to see if the last pixel 34 has been processed. If it has not, a twenty-fourth operation 118 selects the next pixels 34 in the texture 20 and returns control to the twenty-second operation 112 so that all the pixel 34 can be processed in turn. If the fourth test 116 finds that the last pixel 34 has been processed, the process then goes to exit 122. In this way, each pixel 34 in the texture 20 is allocated an A value and a B value.

Figure 17:
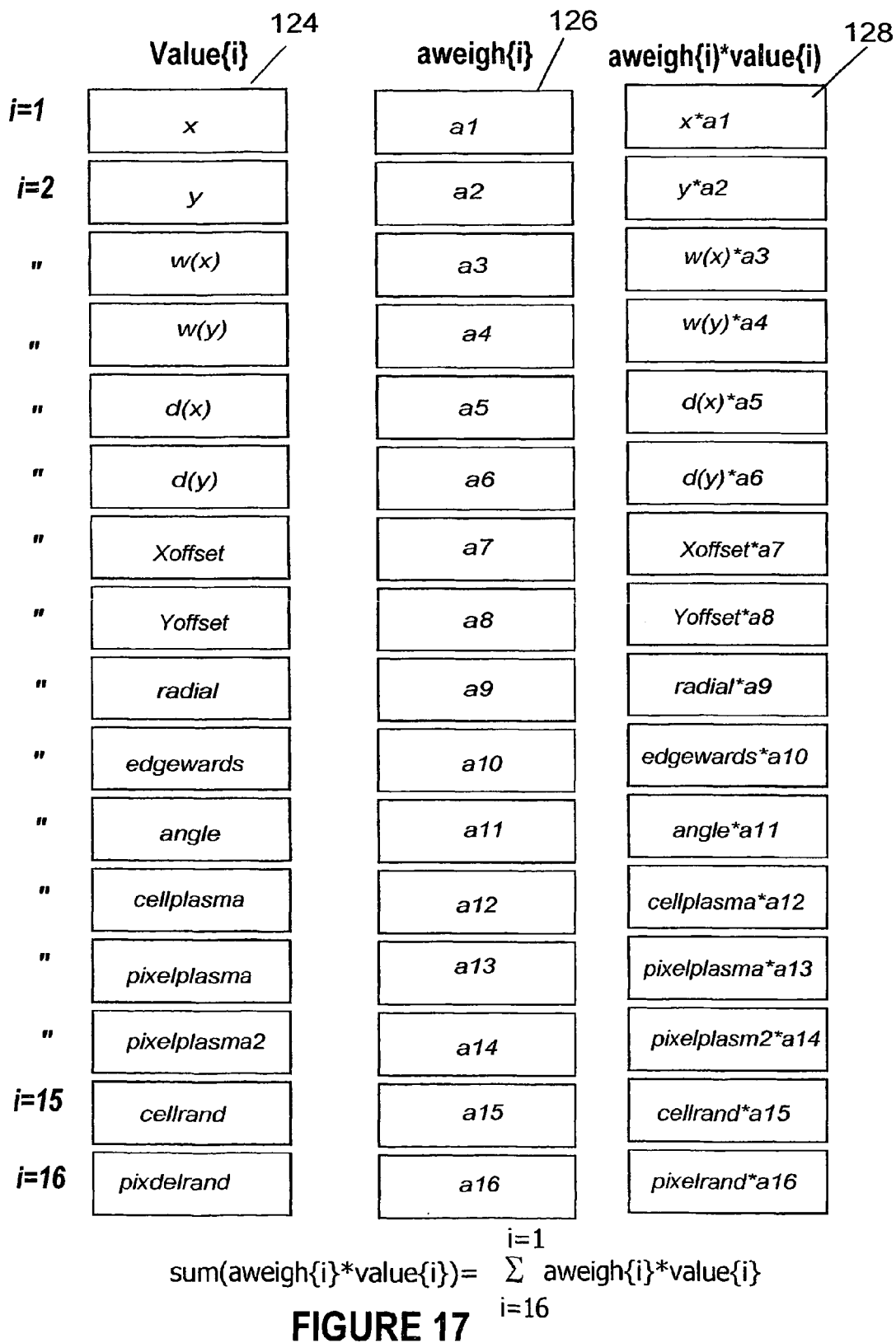
FIG. 17 illustrates, in general terms, how the weighting functions of FIG. 16 are actually applied in the formulae thereon.

Attention is now drawn to FIG. 17 which shows, in tabulated form, the elements in the equations shown in the twenty-second operation 112 and the twenty-fourth operation 114 of FIG. 16. While only the equation in the twenty-second operation 112 is explained, it is to be understood that the equation in the twenty-third operation 114 behaves in just the same way, except that a different weighting table bweigh is used.

A first column 124 shows the elements that make up the vector {i} which is used to characterise each pixel 34 in the texture 20. A second column 126 shows the aweigh weighting function where each of the elements a1-a16 corresponds to one of the 16 separate elements in the first column 124. A third column 128 shows the result of multiplying the first column 124 with the second column 124. Each element x,y etc is multiplied by its respective coefficient a1, a2 etc in the second column to produce the corresponding result in the third column 128. Finally for each pixel 34, the terms appearing in the equations in the twenty-second operation 112 and the twenty-third operation 114 are created. Value{i} is the value of each of the elements in the first column 124. Aweigh{i} is the value of each of the elements in the third column 128. The particular coefficients a1-a16 in the second column 126 can be chosen by the user when creating a texture, or can be fixed values. Certainly, when reconstructing an image, they must be the same values used for its creation. The aweigh weighting function has different coefficients a1-a16 than appear in the corresponding positions in the bweigh weighting function. For example, $$\text{sum}(a\ \text{weigh}\{i\}*\text{value}\{i\}) = [(x*a1)*(x)+(y*a2)*(y)+\ldots+(\text{pixelrand}*a16)*(\text{pixelrand})]$$

Attention is drawn to FIG. 18 explaining some of the elements shown in the first column 124 of FIG. 17.

An origin 130 is shown on a texture 20 at one of its corners. A pixel starting point 132, in one of the cells 221 has its X offset and Y offset measured from the edge of the cell 22', as indicated by first and second arrows 134, 136. The X offset and Y offset are thus the coordinates of the pixel starting point 132 within its particular cell 22'.

A warped position 138 has coordinates w(x), w(y) measured from the origin 130 of the texture 20. The warped position 138 is where the starting point 132 ends up after the warping function, shown in FIG. 10, has been applied. Equally a warped and distorted position 140, where the pixel 34 arrives having been distorted away from the warped position 138, has coordinates d(x) and d(y), also measured from the origin 130 of the texture 20.

Figure 19:
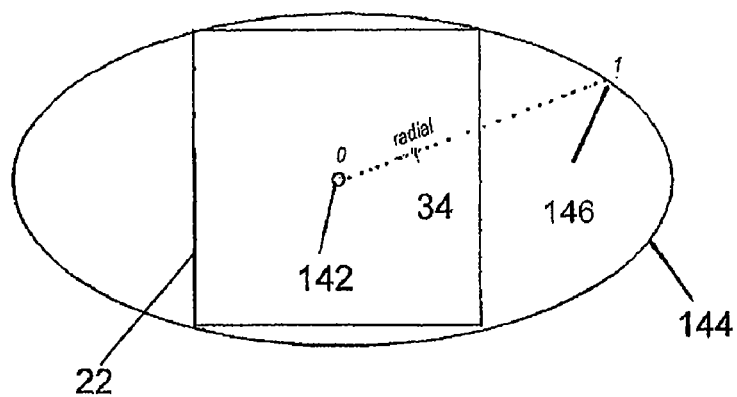
FIG. 19 is a diagram illustrating the meaning of the term "radial" in FIG. 17.

Attention is drawn to FIG. 19 explaining the term radial in the first column 124 of FIG. 17. A line is drawn from the cell 22 centre 142, through the position of the pixel 34 to intersect an ellipse 144 which bounds the cell 22. This ellipse has the same ratio of width to height as the cell that it bounds. For a square cell, the ellipse has equal width and height and is therefore a circle. The line is used as a scale, with the value 0 being given at the cell centre 142 and the value 1 being assigned at the point 146 of intersection with the ellipse 144. The value "radial" is then the proportional point on the line occupied by the coordinates of the pixel 34. In the example shown, it can be seen that "radial" has a value of about 0.25. "The value of radial" is always less than 1.

Figure 20:
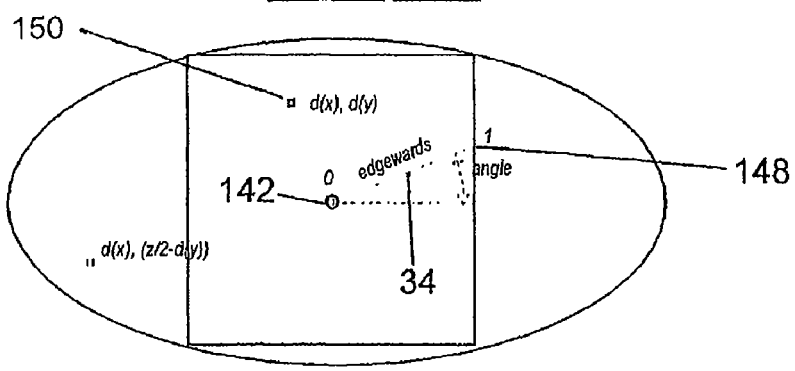
FIG. 20 is a diagram illustrating the meaning of the terms "edgewards", "angle", "cell plasma", "pixel plasma" and "pixel plasma 2", shown in FIG. 17.

FIG. 20 illustrates the term "edgewards", also shown in the first column 124 of FIG. 17. Instead of the line from the centre 142 of the cell 22 through the pixel 34 being extended to the ellipse 144, the line is terminated at a cell edge intersection point 148. Once again, the line to the edge of the cell 22 is used as a scale and the centre of the cell 142 is assigned the value 0 and the cell edge intersection point 148 is assigned the value 1. The proportional position of the pixel 34 along the line gives the value "edgewards". In the example shown, the value of "edgewards" is around 0.5. The value of "edgewards" is always less than 1.

Also shown in FIG. 20 is the term "angle" which is simply the angle, between the line that was used to create "edgewards" and "radial" and the X axis. Likewise, the term "cellplasma" is the Z value (see FIG. 8) of the plasma field at the centre of the cell 142. "Pixelplasma" is the value of the pixel 34 on the plasma field (the Z value, as shown in FIG. 8) at the point d(x), d(y) indicated by the numeral 150 in FIG. 20. Similarly, "pixelplasma2" is the value of the plasma field at the point d(x), ((z/2)−d(y)), where z is the z value derived at d(x), d(y).

The term "celland", used in the first column 124 of FIG. 17, is a pseudo random value, derived from the cell coordinates. The corner, of the cell 22, from which xoffset and yoffset are measured, gives the coordinates within the texture 20 of the cell 22. The cell coordinate is used as the seed for a pseudo random number generator. The result of the pseudo random generated number is "cellrand".

The term "pixelrand" is a pseudo random value derived from the coordinates of the pixel 34 (x,y) and, again, is a pseudo random number in which the pixel 34 coordinates (x,y) are the seed.

Each of the values in the first column 124 of FIG. 17 is scaled so that it lies between 0 and 1. Thus, the equations used in the twenty-second operation 112 and the twenty-third operation 114 always yield a value between 0 and 1. The A Value and the B value represent colour coordinates by which the individual pixels are coloured.

The A and B values can further be processed by employing a warping function, similar to that shown in FIG. 10.

Figure 21:
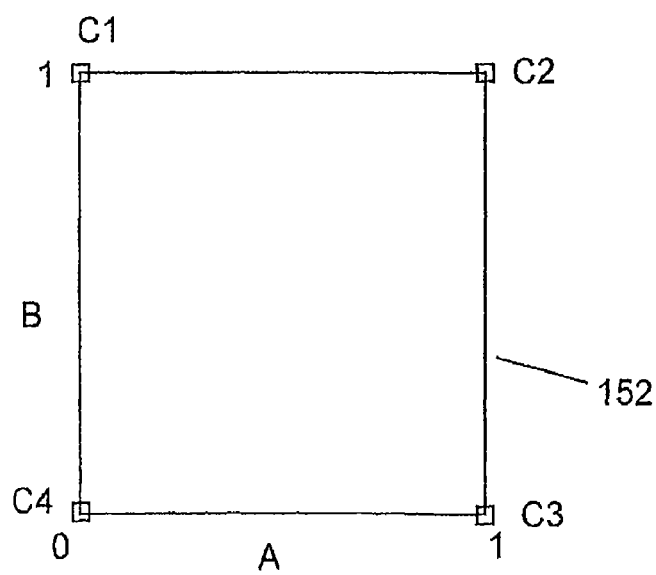
FIG. 21 shows a diagram illustrating how the colour values derived according to the flow chart of FIG. 16, are applied to select the colour of a pixel in the final texture.

Attention is drawn to FIG. 21 where the A color value and the B color value are used to determine the color of each pixel 34. The texture designer selects four colors C1, C2, C3 and C4 to represent the corners of a unit square 152. The colors C1 to C4 are specified, in this instance, by a 24 binary digit number which identifies their color. Which color C1 to C4 goes on which corner of the selection square 152 is entirely up to the texture designer. The texture designer can specify any color they to occupy any of the corners. designer can specify any colour they to occupy any of the corners.

The pixel colour selection square 152 can be imagined as being filled with a field of all of the different mixed hues and saturations available from the corner colours C1 to C4. One of the sides of the selection square is calibrated as a scale 0 to 1 and this is the axis of selection for the A colour selection value. Likewise, an adjacent side of the square is also calibrated 0 to 1 and this is used as a selection axis for the B colour value. Whatever the value of A and B for a particular pixel 34, the corresponding colour is selected from the selection square 152 at the coordinates A,B and applied to that pixel 34 in the completed texture.

In use, the texture designer creates a texture by adjusting all of the variables herein before mentioned, until a satisfactory image of a texture is found. This is then stretched to fit the object 32 (FIG. 7) in the manner of stretching a rubber sheet to fit. For example, on a sphere, the texture 20 may be wrapped around to envelop the surface. Equally, the texture 20 can be projected in the manner of a slide projector, onto the surface to be textured. It can be placed and cropped. Many other methods of mapping a texture onto a surface will be known to one skilled in the art.

FIGS. 22A to 22L show different textures which can be achieved. Since the drawings are in black and white it is impossible to represent the rich variation in colour. That will have to be imagined.

Figure 22A:
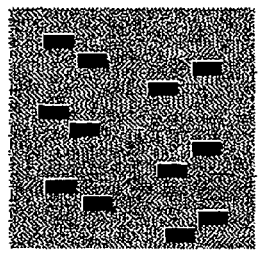
FIG. 22A to FIG. 22L illustrate different textured effects which can be achieved using the present invention.
Figure 22B:
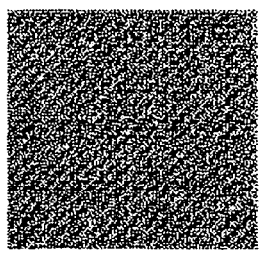
Figure 22C:
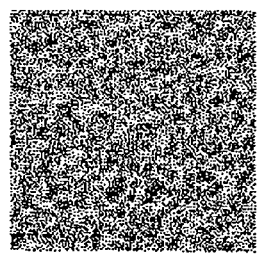
Figure 22D:
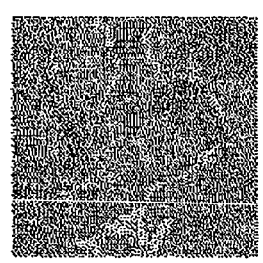
Figure 22E:
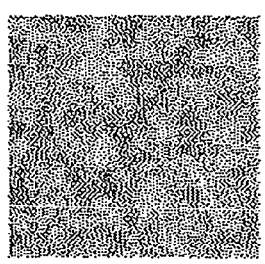
Figure 22F:
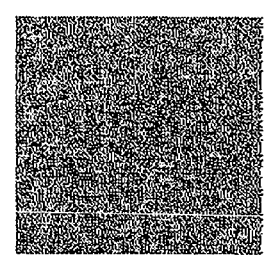
Figure 22G:
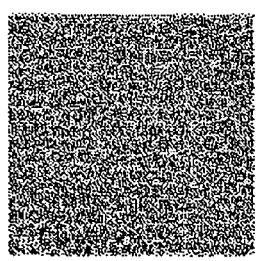
Figure 22H:
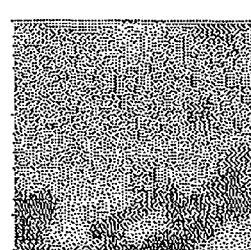
Figure 22I:
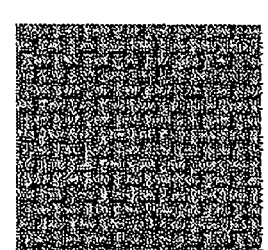
Figure 22J:
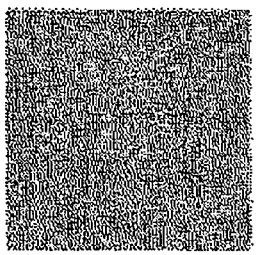
Figure 22K:
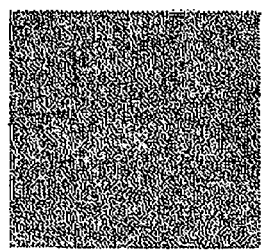
Figure 22L:
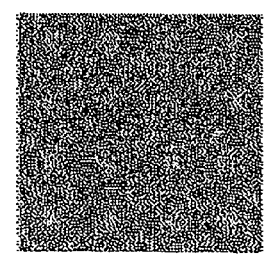

FIG. 22A has a close resemblance to brickwork. FIG. 22B is a fabric. FIG. 22C is a pink granite. FIG. 22D is a blue marble. FIG. 22E is galvanised steel. FIG. 22F is snake skin. FIG. 22G is leopard skin. FIG. 22H is a representation of a dawn sky. FIG. 22I is wickerwork. FIG. 22J is pine grain. FIG. 22K is a cork tile. FIG. 22L is a linoleum tile. It can be seen that, using the variables available and the techniques employed, may different textures can be achieved.

Figure 23:
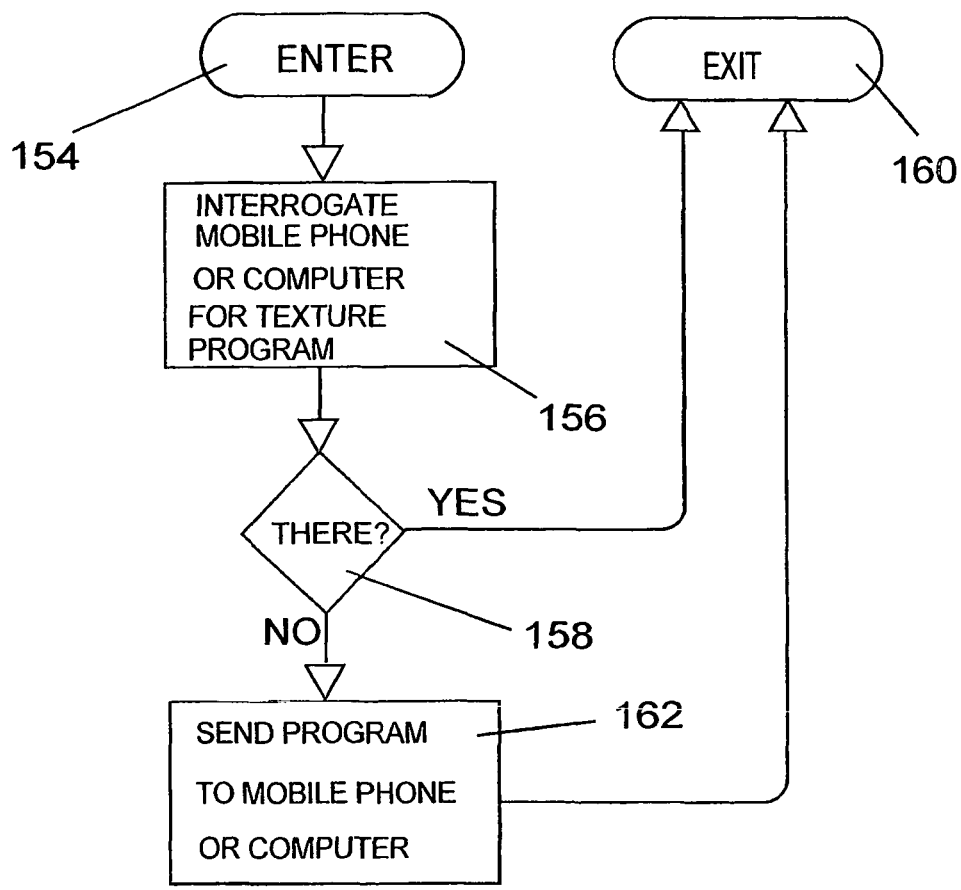
FIG. 23 is a flow chart illustrating how the image generation source of FIG. 1 provides the receiving apparatus with a copy of the texture programme should the receiving apparatus not already possess the texture programme.

FIG. 23 is a flow chart of the activity of the image generation source 10 shown in FIG. 1. The image generation source 10 can be a computer, a URL, an ISP or any other device from which a representation of an image may be sent.

From an entry 154 a twenty-sixth operation 156 has the image generation source 10 interrogate the mobile telephone 16, or any other device which is to receive the image to determine whether or not the texture programme is stored in that device. If a fifth test 158, on receiving a response from the device which is to receive the image, detects that the programme is present, the operation goes to exit 160. If the fifth test 158 detects that the texture programme is not present in the device to receive the image, a twenty-seventh operation 162 has the image generation source 10 send the texture programme to the device 16 so that the device 16 can interpret a texture.

Once the texture programme is in the device, the operation, shown in FIG. 23, proceeds to exit 160.

Figure 24:
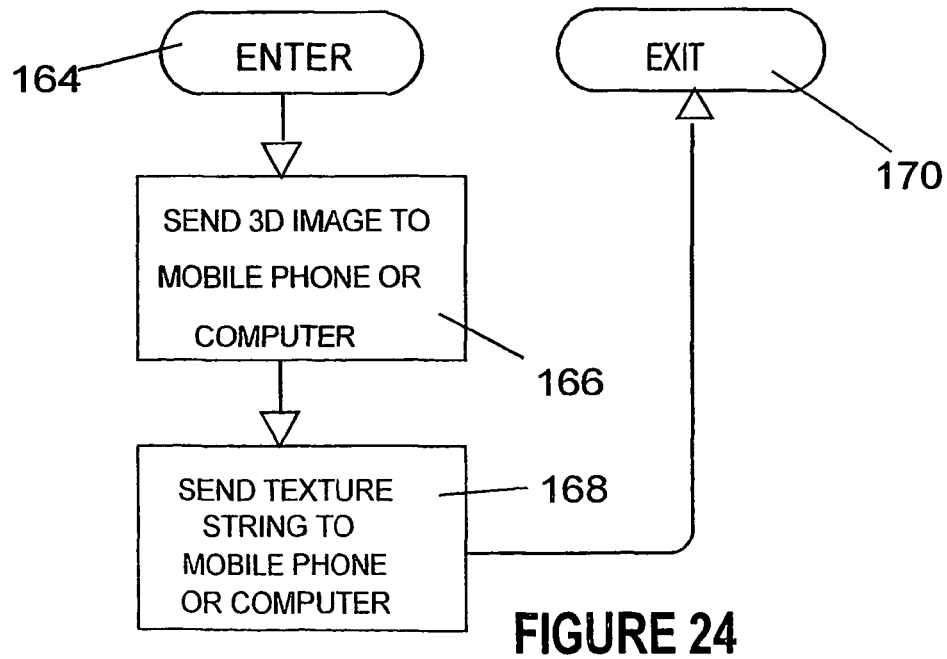
FIG. 24 shows the manner in which the texture information is conveyed to the apparatus which is to generate and display a texture.

FIG. 24 shows the activity of the image generation source 10 when sending an image to a device 16. From an entry 164 a twenty-eighth operation 166 first sends the image to the mobile phone, computer or other device which is to show the image. Thereafter a twenty-ninth operation 168 has the image generation source 10 send a texture string to the mobile phone 16 or computer, or other device, that is to generate the image. As will be explained hereafter, the texture string is a simple concatenation, in known order, of all of the selectable variables which determine a texture.

Once the texture string has been sent to the mobile phone or computer, this operation proceeds to exit 170.

Figure 25:
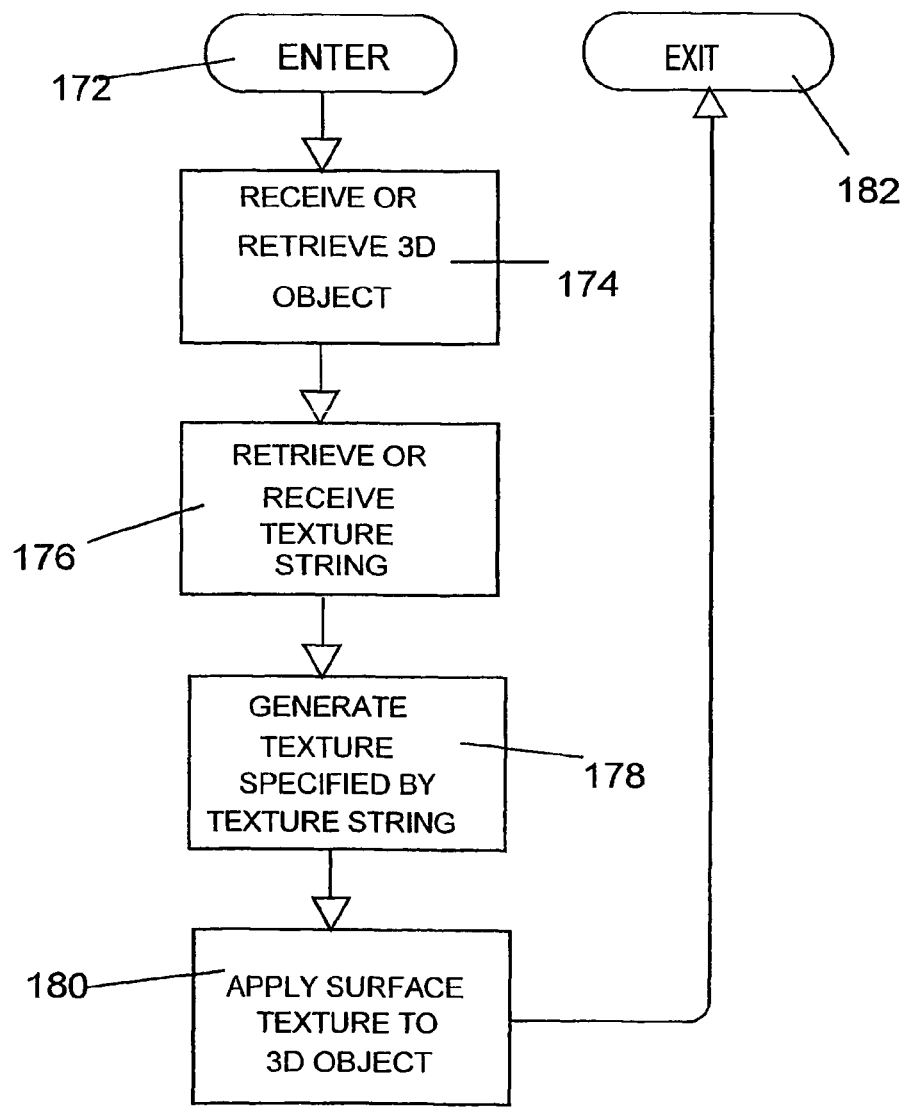
FIG. 25 is a flow chart showing how the apparatus, which is to display the textured image, achieves that effect.

Attention is drawn to FIG. 25 showing the activity of the cell phone 16, computer or other device which is to regenerate an image.

From an entry 172 a thirtieth operation 174 either retrieves the 3-D object which is to be textured from a memory, or receives the 3-D object from an outside source such as the image generation source 10. A thirty-first operation 176 then either retrieves from memory, or receives from an outside source such as the image generation source 10 the texture string which defines the texture to be applied to the three dimensional object. A thirty-second operation 178 then, having received or retrieved the texture string containing the concatenated variables which define the required texture, generates that texture for application to the object. A thirty-third operation 180 then applies the surface texture to the object by projection, wrapping, or any other technique known in the art. Thereafter, the thirty-third operation 180 exits 182.

Figure 26:
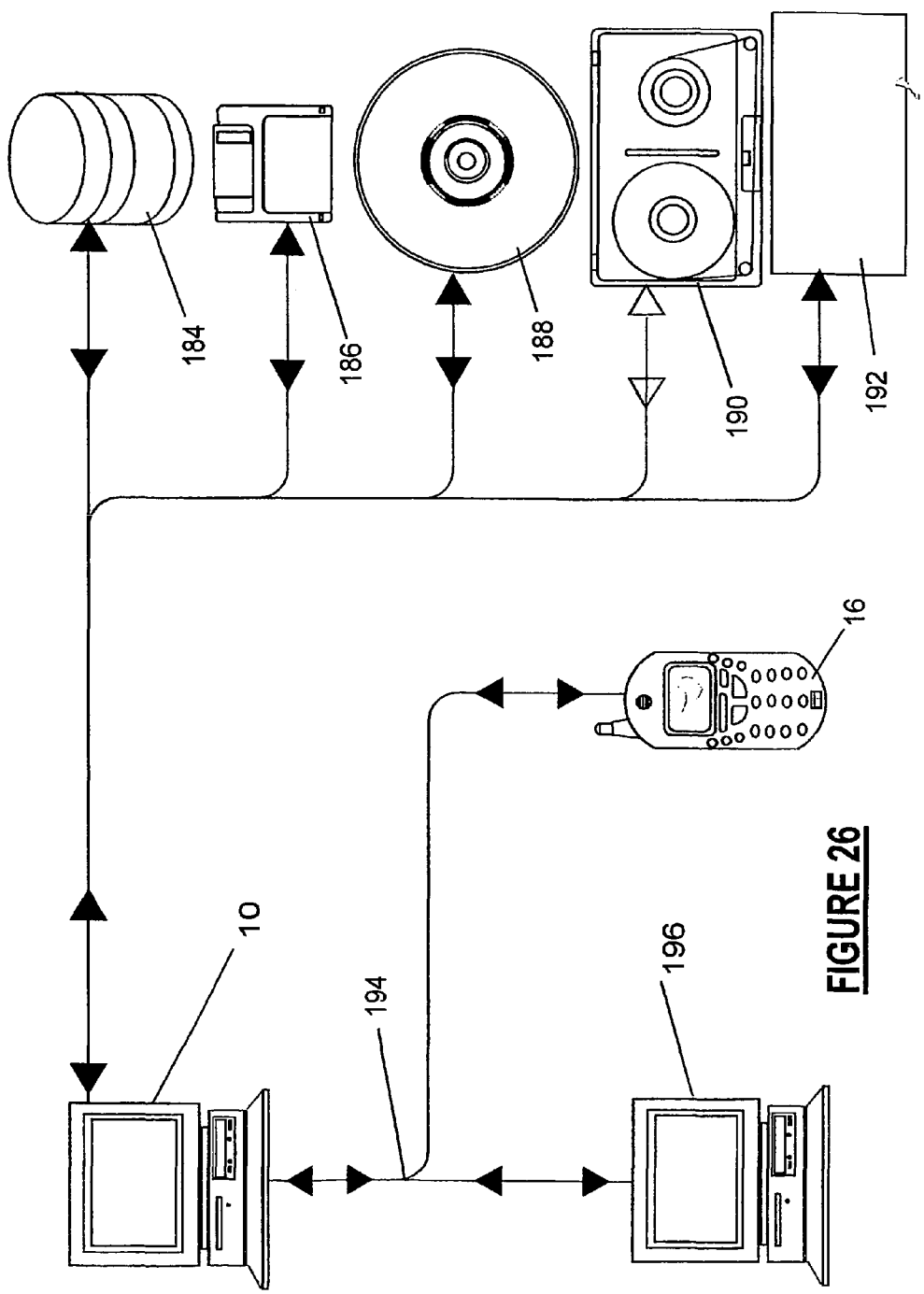
FIG. 26 is a schematic diagram showing various ways in which the texturing information and method of the present invention may be transmitted and/or stored.

Attention is drawn to FIG. 26, showing the various ways in which a texture can be employed. The image generation source 10 can store or retrieve the texture programme and texture strings, for use in providing surface texture on objects, in a disc data store 184 such as hard disc. The programmes and texture strings can likewise be stored and retrieved on removable media 186 such as a floppy disc, pre-recorded or re-writeable compact discs 188, fixed or removable magnetic tapes 190, or in a memory 192 which can be a RAM, ROM, electrically alterable ROM, or any other electronic or physical device which can store a volatile or non-volatile record.

Likewise, the image generation source 10 sends messages 194, via a telecommunications network or internet service or telephone system as earlier described, to and from the remote devices such as the mobile phone 16 or a remote computer terminal 196. The messages from the image generation source 10 include texture strings and, on occasions, the texture 10 programme.

Figure 27:
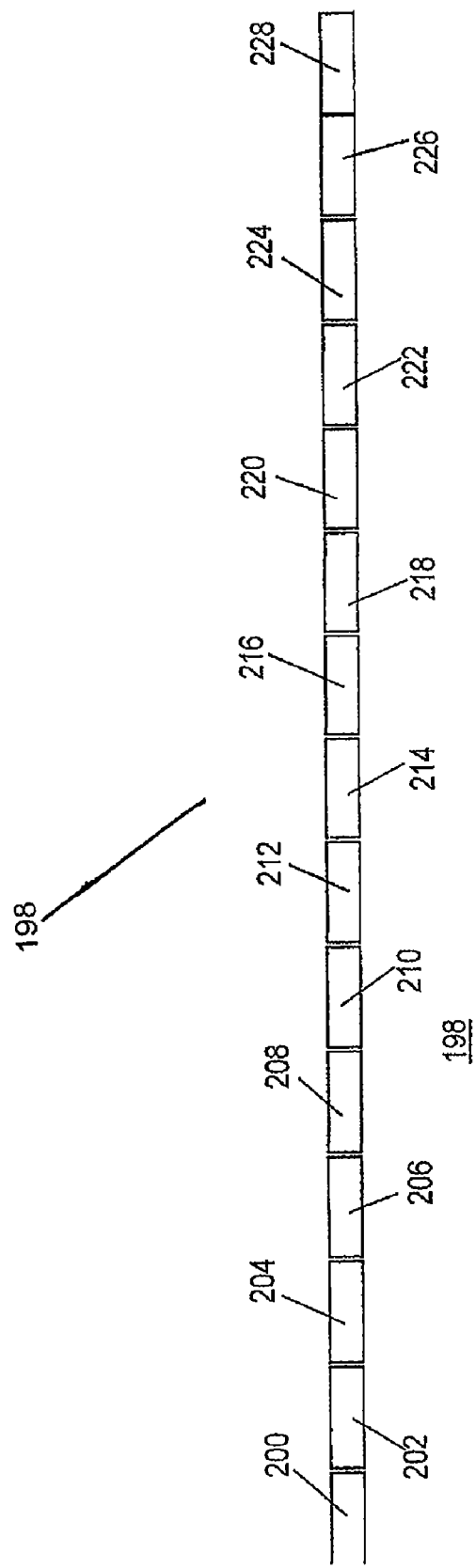
FIG. 27 is an example of a texture string, a sequence of binary digits, which can be sent to a receiving apparatus so that a texture can be generated therein and displayed.

FIG. 27 illustrates the texture string, a serial concatenation of binary words or binary digits, sent by the image generation source 10 to the device 16, 194, or stored and retrieved from a memory 184, 186, 188, 190, 192 for the reconstruction of a texture. Although the elements are here given a specific order, it is to be understood that a different order can be allocated within the invention, and some elements omitted and new elements added.

A first element 200 conveys the seed for the pseudo random number generator which generates the z values for each pixel 34 as illustrated in FIG. 8. A second element 202 contains the roughness value discussed in relation to FIG. 9.

A third element 204 contains the coordinates of the warp function points illustrated in FIGS. 9 and 10. A fourth element 206 conveys the warp mould, selecting either a smooth or linear interpolation as discussed in connection with FIGS. 9 and 10.

A fifth element 208 contains the width distortion factor (Dw) described in relation to FIG. 13. A sixth element 210 contains the height distortion factor (Dh) also described in relation to FIG. 13.

A seventh element 212 contains data to select the cell style, as illustrated in FIG. 2A to FIG. 2E. An eighth element 214 contains information to determine the cell size. A ninth element 216 contains either an indication of the first weighting function aweigh, or the values of another weighting function for use in place of aweigh, as described in relation to FIG. 16. A tenth element 218 conveys either an indication of the second weighting function bweigh, or the values of a second weighting function to be used in its place. This is also described in relation to FIG. 16. An eleventh element 220 contains C1, the colour to be used in a first corner of the selection square 152, illustrated in FIG. 21. A twelfth element 222 contains an indication of the second colour C2 to be used on a second corner of the selection square 152. A thirteenth element 224 contains indication of a third colour C3 to be used on a third corner of the selection square 152. A fourteenth element 226 contains an indication of the fourth colour C4 to be used on the fourth corner of the selection square 152. Finally, and optionally a fifteenth element 228 contains an indication as to which object the texture, defined in the previous elements, is to be applied.

The texture string 198 may be sent as a serial data stream over a radio wave or down a telephone line, using a carrier, or not using a carrier as is appropriate. It may also be sent and stored as a series of parallel words.

This small amount of data is sufficient to generate complex textures and offers advantage in speed, bandwidth and storage. It also has the advantage that the texture program is small and fast, making it suitable for use in low capacity devices such as mobile telephones and palm top computers.

The invention claimed is:

1. A method of generating a surface texture in an image on a device, said method comprising:
   receiving a texture string at the device, the string comprising a plurality of texture related variables for use in generating the surface texture;
   employing a texture field of pixels;
   generating, for each of the pixels, a pseudo-random value using at least one of the plurality of texture related variables;
   dividing the surface into wrappable cells;
   processing each pixel within the image with one or more deformation or distortion functions, said one or more functions being arranged to move the coordinates of each pixel from an initial position;
   determining which cell each pixel occupies following the processing step;
   allocating a color to each pixel based on texture related variables in the texture string and data derived from the output of the generating, processing, dividing and determining steps.

2. A method according to claim 1, wherein the generating step comprises applying a seed number to a pseudo-random number generator.

3. A method as claimed in claim 2, wherein the generating step is modified by a roughness value which is arranged to alter the smoothness of the generated texture field of pixels.

4. A method according to claim 1, wherein said processing step comprises applying a deformation function to each pixel of the image in order to produce a large-scale deformation of the texture.

5. A method according to claim 1, wherein the processing step comprises applying a distortion function to each pixel of the image in order to distort the pattern of the wrappable cells.

6. A method according to claim 1, wherein the dividing step comprises selecting a cell style using a texture related variable in the texture string.

7. A method according to claim 1, wherein the dividing step comprises selecting the size of the cell using a texture related variable in the texture string.

8. A method according to claim 1, wherein said step of allocating a color to each pixel includes taking allocation from within a selected range of colors.

9. A method according to claim 1, including use of a computer program to generate the surface texture.

10. An apparatus for generating a surface texture in an image on a device, said apparatus comprising:
means for receiving a texture string at the device, the string comprising a plurality of texture related variables for use in generating the surface texture;
means for employing a texture field of pixels;
means for generating, for each of the pixels, a pseudo-random value using at least one of the plurality of texture related variables;
means for dividing the surface into wrappable cells;
means for processing each pixel within the image with one or more deformation or distortion functions, said one or more functions being arranged to move the coordinates of each pixel from an initial position;
means for determining which cell each pixel occupies following the processing step;
means for allocating a color to each pixel based on texture related variables in the texture string and data derived from the output of the generating, processing, dividing and determining steps.

11. An apparatus according to claim 10, wherein the generating means is arranged to apply a seed number to a pseudo-random number generator.

12. An apparatus according to claim 11, wherein the generating means is arranged to modify the generation of the pseudo-random number by applying a roughness value which is arranged to alter the smoothness of the generated texture field of pixels.

13. An apparatus according to claim 10, wherein the processing means is arranged to apply a deformation function to each pixel of the image in order to produce a large-scale deformation of the texture.

14. An apparatus according to claim 10, wherein the processing means is arranged to apply a distortion function to each pixel of the image in order to distort the pattern of wrappable cells.

15. An apparatus according to claim 10, wherein the dividing means is arranged to select a cell style using a texture related variable in the texture string.

16. An apparatus according to claim 10, wherein the dividing means is arranged to select the size of a cell using a texture related variable in the texture string.

17. An apparatus according to claim 10, wherein the allocation means is arranged to allocate a color to each pixel from within a selected range of colors.

18. An apparatus according to claim 10, employing a computer program to generate the surface texture.

19. A computer program on a computer readable memory, for execution by a computer, comprising: a code segment for receiving a texture string at the device, the string comprising a plurality of texture related variables for use in generating the surface texture; a code segment for employing a texture field of pixels; a code segment for generating, for each of the pixels, a pseudo-random value using at least one of the plurality of texture related variables; a code segment for dividing the surface into wrappable cells; a code segment for processing each pixel within the image with one or more deformation or distortion functions, said one or more functions being arranged to move the coordinates of each pixel from an initial position; a code segment for determining which cell each pixel occupies following the processing step; a code segment for allocating a color to each pixel based on texture related variables in the texture string and data derived from the output of the generating, processing, dividing and determining steps.

20. A memory device, bearing a copy of a computer program, said computer program comprising an instruction set for:
receiving a texture string at the device, the string comprising a plurality of texture related variables for use in generating the surface texture;
employing a texture field of pixels;
generating, for each of the pixels, a pseudo-random value using at least one of the plurality of texture related variables;
dividing the surface into wrappable cells;
processing each pixel within the image with one or more deformation or distortion functions, said one or more functions being arranged to move the coordinates of each pixel from an initial position;
determining which cell each pixel occupies following the processing step;
allocating a color to each pixel based on texture related variables in the texture string and data derived from the output of the generating, processing, dividing and determining steps.

21. A computer device programmed to generate a surface texture in an image, comprising: a processor programmed to perform the steps of: receiving a texture string at the device, the string comprising a plurality of texture related variables for use in generating the surface texture; employing a texture field of pixels; generating, for each of the pixels, a pseudo-random value using at least one of the plurality of texture related variables; dividing the surface into wrappable cells; processing each pixel within the image with one or more deformation or distortion functions, said one or more functions being arranged to move the coordinates of each pixel from an initial position; determining which cell each pixel occupies following the processing step; allocating a color to each pixel based on texture related variables in the texture string and data derived from the output of the generating, processing, dividing and determining steps.

22. A texture string message on a computer readable memory, for execution by a computer for generating a surface texture in an image, the texture string message comprising the instructions for: receiving a texture string at the device, the string comprising a plurality of texture related variables for use in generating the surface texture; employing a texture field of pixels; generating, for each of the pixels, a pseudo-random value using at least one of the plurality of texture related variables; dividing the surface into wrappable cells; processing each pixel within the image with one or more deformation or distortion functions, said one or more functions being arranged to move the coordinates of each pixel from an initial position; determining which cell each pixel occupies following the processing step; allocating a color to each pixel based on texture related variables in the texture string and data derived from the output of the generating, processing, dividing and determining steps.

23. A computer programmed to generate a surface texture in an image by using a texture data string, comprising: a processor programmed to perform the steps of: receiving a texture string at the device, the string comprising a plurality of texture related variables for use in generating the surface texture; employing a texture field of pixels; generating, for each of the pixels, a pseudo-random value using at least one of the plurality of texture related variables; dividing the surface into wrappable cells; processing each pixel within the image with one or more deformation or distortion functions, said one or more functions being arranged to move the coordinates of each pixel from an initial position; determining which cell each pixel occupies following the processing step; allocating a color to each pixel based on texture related variables in the texture string and data derived from the output of the generating, processing, dividing and determining steps.

* * * * *

UNITED STATES PATENT AND TRADEMARK OFFICE
CERTIFICATE OF CORRECTION

PATENT NO. : 7,463,766 B2  Page 1 of 1
APPLICATION NO. : 10/469656
DATED : December 9, 2008
INVENTOR(S) : Jonathan Gordon Grove It is certified that error appears in the above-identified patent and that said Letters Patent is hereby corrected as shown below:

Column 4, lines 7 through 9,

Delete second instance of "patterns at every edge 24, 26, 28, 30 of the texture. In this case, the Hexagonal cells 22 form a complete tessellation."

Column 10, lines 26 and 27,

Delete second instance of "designer can specify any colour they to occupy any of the corners."

Signed and Sealed this

Tenth Day of February, 2009

JOHN DOLL
*Acting Director of the United States Patent and Trademark Office*